United States Patent [19]

Hara

[11] Patent Number: 5,481,623
[45] Date of Patent: Jan. 2, 1996

[54] APPARATUS FOR DETERMINING AN IMAGE POSITION ON IMAGING MEDIA

[75] Inventor: Shoji Hara, Kanagawa, Japan

[73] Assignee: Fuji Photo Film Co., Ltd., Kanagawa, Japan

[21] Appl. No.: 687,263

[22] Filed: Apr. 18, 1991

[30] Foreign Application Priority Data

| Apr. 19, 1990 | [JP] | Japan | 2-103393 |
| Apr. 26, 1990 | [JP] | Japan | 2-111147 |
| Apr. 27, 1990 | [JP] | Japan | 2-114610 |
| Jun. 21, 1990 | [JP] | Japan | 2-163140 |

[51] Int. Cl.$^6$ ............................................... G06K 9/00
[52] U.S. Cl. .......................................................... 382/128
[58] Field of Search ................................. 382/6, 39, 48, 382/128, 132, 282; 378/37

[56] References Cited

U.S. PATENT DOCUMENTS

| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,527,060 | 7/1985 | Suzuki et al. | 250/327.2 |
| 4,581,760 | 4/1986 | Schiller et al. | 382/48 |
| 4,907,156 | 3/1990 | Doi et al. | 382/6 |
| 4,952,807 | 8/1990 | Adachi | 250/327.2 |
| 4,962,539 | 10/1990 | Takeo et al. | 382/6 |
| 5,027,413 | 6/1991 | Barnard | 382/39 |
| 5,046,118 | 3/1991 | Ajewole et al. | 382/6 |
| 5,068,907 | 11/1991 | Takeo | 382/48 |

FOREIGN PATENT DOCUMENTS

| 56-11395 | 2/1981 | Japan . |
| 61-5193 | 2/1986 | Japan . |

Primary Examiner—Jose L. Couso
Attorney, Agent, or Firm—Sughrue, Mion, Zinn, Macpeak & Seas

[57] ABSTRACT

An apparatus for determining an image position obtains an image signal representing the whole image, which has been recorded approximately over the whole area of a recording medium, by carrying out an image read-out operation from approximately the whole area of the recording medium, at part of which an object image has been recorded. The position of the object image on the recording medium is determined on the basis of the image signal. A certainty operation device is provided to calculate the degrees of certainty, which indicate step-wise the levels of probability that the object image will be present in partial regions on said recording medium. The degree of certainty is calculated for each of the partial regions on the recording medium, in which partial regions the object image is expected as being recorded. A position determining device is provided to determine the position of the object image on the recording medium on the basis of a plurality of the degrees of certainty, which have been calculated for the respective partial regions on the recording medium.

2 Claims, 14 Drawing Sheets

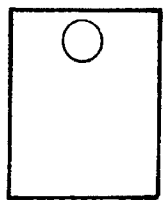 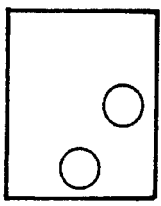 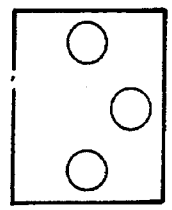
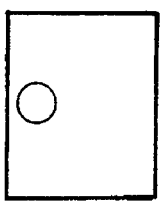 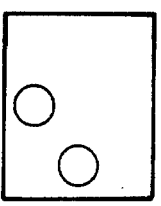 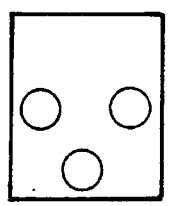
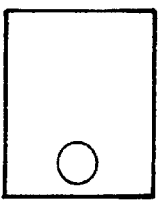 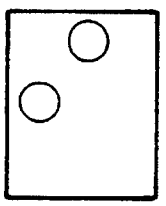 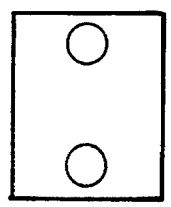 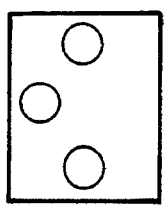
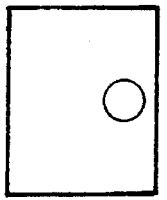 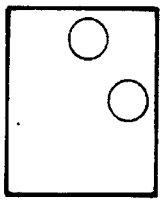 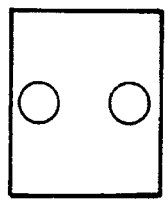 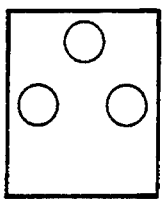 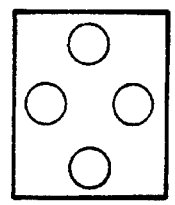
FIG.9A  FIG.9B  FIG.9C  FIG.9D  FIG.9E

APPARATUS FOR DETERMINING AN IMAGE POSITION ON IMAGING MEDIA

BACKGROUND OF THE INVENTION

1. Field of the Invention

This invention relates to an apparatus for determining an image position, wherein the position of a desired object image on a recording medium is determined on the basis of an image signal, which has been detected from approximately the whole surface of the recording medium and which represents the whole image recorded on approximately the whole surface of the recording medium. The desired object image having been recorded at on a portion the recording medium. This invention also relates to a method for adjusting read-out conditions and/or image processing conditions for a radiation image, wherein read-out conditions for a final readout and/or image processing conditions are adjusted on the basis of an image signal representing a radiation image in which a desired object image is embedded.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out. The X-ray image is read out from the X-ray film and converted into an electric signal (image signal), and the image signal is processed and then used for reproducing the X-ray image as a visible image on a photocopy, or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in Japanese Unexamined Patent Publication Nos. 55(1980)-12429, 56(1981)-11395, 55(1980)-163472, 56(1981)-104645, and 55(1980)-116340, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, or on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed in, for example, Japanese Unexamined Patent Publication Nos. 58(1983)-67240, 58(1983)-67241, and 58(1983)-67242. The proposed radiation image recording and reproducing systems are constituted such that a preliminary read-out operation (hereinafter simply referred to as the "preliminary readout") is carried out in order to approximately ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (including the preliminary readout image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing, which affect the gradation, sensitivity, or the like, of a visible image reproduced from the image signal. The proposed method is applicable to cases where an image signal is obtained from a radiation image recorded on a recording medium such as conventional X-ray film, as well as to systems using stimulable phosphor sheets.

In the course of recording a radiation image of an object on a recording medium, it is often desirable for portions of the object not related to a diagnosis, or the like, to be prevented from being exposed to radiation. Also, when the object portions not related to a diagnosis, or the like, are exposed to radiation, the radiation is scattered by such portions to the portion that is related to a diagnosis, or the like, and the image quality is adversely affected by the scattered radiation. Therefore, when a radiation image of an object is recorded on the recording medium, an irradiation field stop is often used to limit the irradiation field to an area smaller than the overall recording region of the recording medium so that radiation is irradiated only to that portion of the object, which is to be viewed, and part of the recording medium (i.e. the region inside of the irradiation field). The region inside of the irradiation field is often composed of an object image region, in which the image of the object is recorded, and a background region, upon which the radiation impinged directly without passing through the object. Of these regions on the recording medium, the region which it is necessary to reproduce is only the object image region. Therefore, when a visible image is to be reproduced from an image signal representing a radiation image, the shape and location of the object image region in the radiation image, which has been recorded over the whole area of the recording medium, should be determined, and image signal components corresponding to the object image region should be determined from the image signal. Appropriate read-out conditions for the final readout and/or appropriate image processing conditions should then be adjusted on the basis of the image signal components, which have thus been determined. In this manner, a visible reproduced image can be obtained which has good image quality and can serve as an effective tool in, particularly, the efficient and accurate diagnosis of an illness. When the shape and location of the object image region are determined, characteristics of the radiation image depending on the structure of an image recording apparatus used to record the radiation image of the object, or the like, and the shape of the object are often taken into consideration. By way of example, a method for determining the position of an object image region in an X-ray image of the mamma of a human body is disclosed in Japanese Unexamined Patent Publication No. 61(1986)-170178. With the disclosed method, a change in the value of an image signal at the boundary between an object image region (i.e. a mamma pattern) and a background region is detected by utilizing such characteristics that the mamma pattern is recorded in an approximately semicircular shape on a recording medium and the background region is located outward from the circular arc, which defines the boundary of the approximately semicircular mamma pattern.

However, the methods described above are based on the assumption that the relationship between the position of the contour of an irradiation field and the position of an object image region in the region inside of the irradiation field, or the like, coincides with a predetermined condition. Specifically, based on such assumption, operations are carried out on an image signal in order to find whether each of a plurality of partial regions on the recording medium, which are expected as falling within the region inside of the irradiation field, falls or does not fall within the region inside of the irradiation field. Therefore, it often occurs that the shape and location of the object image region cannot be determined by taking the shape of the object, or the like, into consideration. Such problems occur when the relationship between the position of the irradiation stop and the position of the object differs slightly from the predetermined relationship or when patterns of characters formed of lead having a low radiation transmittance are recorded together with the object image on a recording medium. If the shape and location of the object image region cannot be determined, the read-out conditions for the final readout and/or the image processing conditions, which are appropriate for the object image region, cannot be determined. In such cases, for example, the read-out conditions for the final readout and/or the image processing conditions are determined on the basis of the image signal detected from the entire area of the recording medium, including the region outside of the irradiation field, which region was exposed to little radiation. Specifically, the read-out conditions for the final readout and/or the image processing conditions are determined such that the whole radiation image may have comparatively good image quality in a reproduced visible image. As a result, a reproduced visible image is obtained wherein the image density of the object image region is markedly high (or the luminance of the object image region is markedly low when the reproduced image is displayed on a CRT display device, or the like). Such a reproduced image is not suitable for the viewing purposes.

SUMMARY OF THE INVENTION

The primary object of the present invention is to provide an apparatus for determining an image position, wherein the position of a specific image on a recording medium is determined accurately on the basis of an image signal detected from the recording medium.

Another object of the present invention is to provide a method for adjusting read-out conditions and/or image processing conditions for a radiation image, wherein a probability density function of an image signal is obtained, the pattern of which probability density function is not very different from a standard pattern, and wherein appropriate read-out conditions for a final readout and/or appropriate image processing conditions are determined accurately on the basis of the results of an analysis of the probability density function.

The specific object of the present invention is to provide a method for adjusting read-out conditions and/or image processing conditions for a mamma radiation image including a chest wall pattern, wherein a mamma pattern and a retro-mamma space (i.e. the boundary region between the mamma pattern and a chest wall pattern in a mamma radiation image including a chest wall pattern) are detected as a region of interest from the mamma radiation image including a chest wall pattern, and wherein the read-out conditions for a final readout and/or the image processing conditions are determined on the basis of image signal components of the image signal, which correspond to the region of interest.

The present invention provides an apparatus for determining an image position, wherein an image signal representing the whole image, which has been recorded approximately over the whole area of a recording medium, is obtained by carrying out an image read-out operation from approximately the whole area of the recording medium, at part of which an object image has been recorded, and wherein the position of the object image on the recording medium is determined on the basis of the image signal.

The apparatus for determining an image position has the following:

i) a certainty operation means for calculating the degrees of certainty, which indicate step-wise the levels of probability that said object image will be present in partial regions on said recording medium, the degree of certainty being calculated for each of the partial regions on said recording medium, in which partial regions said object image is expected as being recorded, and ii) a position determining means for determining the position of said object image on said recording medium on the basis of a plurality of the degrees of certainty, which have been calculated for the respective partial regions on the recording medium.

Heretofore, the presence or absence of an object image in each of partial regions, in which an object image is expected as being recorded, has been determined on the basis of only the results of an analysis of each partial region. Therefore, if the analysis of each partial region, in which an object image has been recorded, is carried out inaccurately, the presence or absence of the object image in each partial region cannot be determined.

The apparatus for determining an image position in accordance with the present invention is provided with the certainty operation means for calculating the degrees of certainty, which indicate step-wise the levels of probability that the object image will be present in partial regions on the recording medium. The degree of certainty is calculated for each of the partial regions on the recording medium, in which partial regions the object image is expected as being recorded. The apparatus for determining an image position in accordance with the present invention is also provided with the position determining means for determining the position of the object image on the recording medium on the basis of a plurality of the degrees of certainty, which have been calculated for the respective partial regions on the recording medium. Therefore, with the apparatus for determining an image position in accordance with the present invention, even if, for example, the shape and the position of the object image are slightly different from a predetermined shape and a predetermined position, the degrees of certainty, which have been calculated for the respective partial regions on the recording medium, can be compared with each other. Thereafter, it is found that the object image is present in the partial region, which is associated with the highest degree of certainty. Accordingly, the position, at which the object image has been recorded, can be determined more accurately than with the conventional techniques.

The present invention also provides a first apparatus for determining a mamma image position, which has the following:

i) a prospective object image region finding means for:
   obtaining an image signal made up of a series of image signal components representing a radiation image of an object, which radiation image has been recorded on a recording medium and is composed of:
   a) a single object image region or a plurality of object image regions, in each of which a mamma pattern has been recorded such that it may project in an approximately semicircular shape from an edge of said recording medium toward the middle of the recording medium, the mamma pattern having been recorded by irradiating radiation, which has passed through a mamma, to the recording medium,
   b) a background region, which surrounds the approximately semicircular edge of each the object image region, and upon which the radiation impinged directly without passing through the object, and
   c) a scattered radiation image region, which is adjacent to the background region, and upon which scattered radiation impinged,
   detecting a change in the image signal at the approximately semicircular edge of each the object image region on the basis of said image signal, and
   thereby finding a single prospective object image region or a plurality of prospective object image regions, and ii) a position determining means for judging the correctness or incorrectness of each the prospective object image region on the basis of a mean-level value of the values of the image signal components corresponding to each said prospective object image region, and thereby determining the position of each the object image region in the radiation image.

The term "mean-level value" as used herein means one of various types of values which represent the mean level of the values of the image signal components of the image signal. For example, the mean-level value may be the arithmetical mean, the geometric mean, or the median value of the values of the image signal components of the image signal. Alternatively, the mean-level value may be calculated with the formula expressed as (maximum value–minimum value)/2.

The present invention further provides a second apparatus for determining a mamma image position, which has the following:

i) a prospective object image region finding means for:
   obtaining an image signal made up of a series of image signal components representing a radiation image of an object, which radiation image has been recorded on a recording medium and is composed of:
   a) a single object image region or a plurality of object image regions, in each of which a mamma pattern has been recorded such that it may project in an approximately semicircular shape from an edge of the recording medium toward the middle of the recording medium, the mamma pattern having been recorded by irradiating radiation, which has passed through a mamma, to the recording medium, b) a background region, which surrounds the approximately semicircular edge of each the object image region, and upon which the radiation impinged directly without passing through the object, and c) a scattered radiation image region, which is adjacent to the background region, and upon which scattered radiation impinged, detecting a change in the image signal at the approximately semicircular edge of each the object image region on the basis of said image signal, and thereby finding a single prospective object image region or a plurality of prospective object image regions, and ii) a position determining means for judging the correctness or incorrectness of each the prospective object image region on the basis of the geometric form of each the prospective object image region, and thereby determining the position of each the object image region in said radiation image.

The first and second apparatuses for determining a mamma image position in accordance with the present invention process a radiation image of an object, which radiation image has been recorded on a recording medium and is composed of:

a) a single object image region or a plurality of object image regions, in each of which a mamma pattern has been recorded such that it may project in an approximately semicircular shape from an edge of the recording medium toward the middle of the recording medium, the mamma pattern having been recorded by irradiating radiation, which has passed through a mamma, to the recording medium, b) a background region, which surrounds the approximately semicircular edge of each object image region, and upon which the radiation impinged directly without passing through the object, and c) a scattered radiation image region, which is adjacent to the background region, and upon which scattered radiation .impinged.

With the first apparatus for determining a mamma image position in accordance with the present invention, the position of the object image region is determined accurately on the basis of the findings that the amount of radiation to which the recording medium is exposed varies for the object image region and the scattered radiation image region. Specifically, with the first apparatus for determining a mamma image position in accordance with the present invention, a change in the image signal at the approximately semicircular edge of each object image region is detected on the basis of the image signal representing the radiation image, and a single prospective object image region or a plurality of prospective object image regions are thereby found. For this purpose, the method disclosed in Japanese Unexamined Patent Publication No. 61(1986)-170178 or the method described in an embodiment of the first apparatus for determining a mamma image position in accordance with the present invention, which will be described later, may be employed. Thereafter, a judgment is made as to the correctness or incorrectness of each prospective object image region on the basis of the mean-level value of the values of the image signal components corresponding to each prospective object image region. Therefore, the position of the object image region in the radiation image can be determined accurately.

The position of the object image region can also be determined accurately on the basis of the findings that the object image region has an approximately semicircular shape. With the second apparatus for determining a mamma image position in accordance with the present invention, a single prospective object image region or a plurality of prospective object image regions are found in the same manner as that in the first apparatus for determining a mamma image position in accordance with the present invention. Thereafter, a judgment is made as to the correctness or incorrectness of each prospective object image region on the basis of the geometric form of each prospective object image region. Therefore, as in the first apparatus for determining a mamma image position in accordance with the present invention, the position of the object image region in the radiation image can be determined accurately.

A method for adjusting read-out conditions and/or image processing conditions for a radiation image in accordance with the present invention is applied when a stimulable phosphor sheet is utilized and a preliminary readout is carried out.

Specifically, the present invention still further provides a method for adjusting read-out conditions and/or image processing conditions for a radiation image, wherein a first image signal made up of a series of image signal components representing a radiation image, in which an object image is embedded at part, is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image includes the steps of:

i) detecting a change in the first image signal at an edge of the object image, ii) thereby finding a plurality of points, which are spaced apart from each other and located at positions in the vicinity of the edge of the object image, said positions being slightly spaced apart from the object image, iii) creating a probability density function of the image signal components of the first image signal corresponding to a region, which is surrounded by lines connecting the plurality of the thus found points and which approximately corresponds to the object image, and iv) adjusting the read-out conditions and/or the image processing conditions on the basis of the results of an analysis of the probability density function.

A method for adjusting image processing conditions for a radiation image in accordance with the present invention is applied when a recording medium, such as a stimulable phosphor sheet or X-ray film, is utilized.

Specifically, the present invention also provides a method for adjusting image processing conditions for a radiation image, wherein image processing conditions, under which an image signal is to be image processed, are adjusted on the basis of the image signal made up of a series of image signal components representing a radiation image, in which an object image is embedded at part,
the method for adjusting image processing conditions for a radiation image includes the steps of:
i) detecting a change in the image signal at an edge of said object image,
ii) thereby finding a plurality of points, which are spaced apart from each other and located at positions in the vicinity of the edge of the object image, the positions being slightly spaced apart from the object image,
iii) creating a probability density function of the image signal components of the image signal corresponding to a region, which is surrounded by lines connecting the plurality of the thus found points and which approximately corresponds to the object image, and
iv) adjusting the image processing conditions on the basis of the results of an analysis of the probability density function.

The phase "lines connecting a plurality of points" as used herein for the method for adjusting read-out conditions and/or image processing conditions for a radiation image and the method for adjusting image processing conditions for a radiation image in accordance with the present invention means lines which surround the object image approximately along its edge. By way of example, the lines connecting a plurality of points may constitute straight lines, a zigzag line, a curve of secondary order, a curve of third order, or a spline-like curve.

In general, radiation images include noise components due to, for example, the sway in the radiation employed during the recording of the radiation images. Therefore, it often occurs that the edge of an object image cannot be detected accurately. However, it is possible for a figure to be drawn which approximates the edge of the object image. The method for adjusting read-out conditions and/or image processing conditions for a radiation image and the method for adjusting image processing conditions for a radiation image in accordance with the present invention are based on such findings.

However, in cases where the edge of an object image cannot be detected accurately and therefore a plurality of points, which are considered as being present on the edge of the object image, are detected on the basis of the image signal (or the first image signal), there is the risk that part of the object image is not included within the region surrounded by the lines connecting the thus detected points. In such cases, the problem often occurs in that the image signal components of the image signal corresponding to the object image are not detected accurately, and therefore appropriate read-out conditions for the final readout and/or appropriate image processing conditions cannot be determined.

In order for the aforesaid problems to be eliminated, with the method for adjusting read-out conditions and/or image processing conditions for a radiation image and the method for adjusting image processing conditions for a radiation image in accordance with the present invention, after a plurality of points, which are considered as being present on the edge of the object image, are detected, the detected points are moved in directions slightly heading away from the object image. In this manner, a plurality of points are found, which are located at positions in the vicinity of the edge of the object image, the positions are slightly spaced apart from the object image. Thereafter, the thus found points are connected with each other. When the once detected points are thus moved in directions slightly heading away from the object image, the whole area of the object image is always included in the region surrounded by the plurality of the thus found points. The image signal components of the image signal, which correspond to the region surrounded by the plurality of the thus found points, include the image signal components corresponding to the region outside of the region corresponding to the object image. However, when the region is employed which is surrounded by the points located in the vicinity of the edge of the object image, the area of the region, which is outside of the region corresponding to the object image but is inside of the region surrounded by the points located in the vicinity of the edge of the object image, does not vary substantially for different radiation images. Therefore, the pattern of the probability density function of the image signal components of the image signal, which correspond to the region surrounded by the points located in the vicinity of the edge of the object image, is not very different from a standard pattern. Accordingly, appropriate read-out conditions for the final readout and/or appropriate image processing conditions can be determined accurately on the basis of the results of an analysis of the probability density function.

As described above, with the method for adjusting read-out conditions and/or image processing conditions for a radiation image and the method for adjusting image processing conditions for a radiation image in accordance with the present invention, a change in the image signal (or the first image signal) at an edge of the object image is detected. A plurality of points are thereby found, which are spaced apart from each other and located at positions in the vicinity of the edge of the object image, the positions being slightly spaced apart from the object image. A probability density function of the image signal components of the image signal (or the first image signal) corresponding to a region, which is surrounded by lines connecting the plurality of the thus found points and which approximately corresponds to the object image, is then created. Thereafter, the read-out conditions and/or the image processing conditions are adjusted on the basis of the results of an analysis of the probability density function. Therefore, even if the object image, or the like, has been recorded in a pattern markedly different from a standard pattern, a probability density function of an image signal, which function has a pattern close to a standard pattern, can be obtained. Accordingly, appropriate read-out conditions for the final readout and/or appropriate image processing conditions can be determined accurately on the basis of the results of an analysis of the probability density function.

A method for adjusting read-out conditions and/or image processing conditions for a mamma radiation image including a chest wall pattern in accordance with the present invention is applied when a stimulable phosphor sheet is utilized and a preliminary readout is carried out.

Specifically, the present invention further provides a method for adjusting read-out conditions and/or image processing conditions for a mamma radiation image including a chest wall pattern, wherein a first image signal made up of a series of image signal components representing respective picture elements in a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, the radiation image being composed of:

a) an object image region constituted of a chest wall pattern, which extends along an edge of the stimulable phosphor sheet, and a mamma pattern projecting in an approximately semicircular shape from the chest wall pattern toward an edge of the stimulable phosphor sheet facing the edge, along which the chest wall pattern extends, and b) a background region, which is adjacent to the object image region, and upon which the radiation impinged directly without passing through the object, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a mamma radiation image including a chest wall pattern having the steps of:

i) detecting a change in the first image signal, ii) thereby finding a plurality of boundary points between said object image region and the background region, iii) finding the center of gravity on the stimulable phosphor sheet on the basis of the image signal components of the first image signal, which represent a plurality of picture elements located along a line connecting each said boundary point and the edge of the stimulable phosphor sheet, along which edge the chest wall pattern extends, iv) finding a picture element spaced apart from the position, at which the center of gravity is located, in a direction heading away from each the boundary point by a distance equal to a value obtained by multiplying the distance between the position, at which the center of gravity is located, and said boundary point by a predetermined factor, and v) adjusting the read-out conditions and/or the image processing conditions on the basis of the image signal components of the first image signal corresponding to the region surrounded by the plurality of the boundary points and a plurality of the picture elements, which have thus been found.

A method for adjusting image processing conditions for a mamma radiation image including a chest wall pattern in accordance with the present invention is applied when a recording medium, such as a stimulable phosphor sheet or X-ray film, is utilized.

Specifically, the present invention still further provides a method for adjusting image processing conditions for a mamma radiation image including a chest wall pattern, wherein an image signal made up of a series of image signal components representing respective picture elements in a radiation image of an object is obtained by photoelectrically reading out the radiation image from a recording medium, on which the radiation image has been recorded, the radiation image being composed of:

a) an object image region constituted of a chest wall pattern, which extends along an edge of the recording medium, and a mamma pattern projecting in an approximately semicircular shape from the chest wall pattern toward an edge of the recording medium facing the edge, along which the chest wall pattern extends, and b) a background region, which is adjacent to the object image region, and upon which the radiation impinged directly without passing through the object, and image processing conditions, under which the image signal is to be image processed, are adjusted on the basis of the image signal, the method for adjusting image processing conditions for a mamma radiation image including a chest wall pattern having the steps of:

i) detecting a change in the image signal, ii) thereby finding a plurality of boundary points between the object image region and the background region, iii) finding the center of gravity on the recording medium on the basis of the image signal components of the image signal, which represent a plurality of picture elements located along a line connecting each the boundary point and the edge of the recording medium, along which edge the chest wall pattern extends, iv) finding a picture element spaced apart from the position, at which the center of gravity is located, in a direction heading away from each the boundary point by a distance equal to a value obtained by multiplying the distance between the position, at which the center of gravity is located, and the boundary point by a predetermined factor, and v) adjusting the image processing conditions on the basis of the image signal components of the image signal corresponding to the region surrounded by the plurality of the boundary points and a plurality of the picture elements, which have thus been found.

In general, by obtaining reproduced visible images in which the image density, or the like, of mamma patterns is appropriate for diagnoses, most of diagnoses from mamma radiation images can be made accurately. However, in cases where a tumor, such as a cancer, is present on the side inward from a mamma in a human body, the effects from the tumor appear in the boundary region between the mamma pattern and a chest wall pattern (i.e. in the retro-mamma space) in the mamma radiation image including the chest wall pattern. By way of example, the mean-level image density (i.e. the mean-level value of the values of the image signal) varies markedly for the mamma pattern and the chest wall pattern, and therefore the boundary between the mamma pattern and the chest wall pattern appears in the retro-mamma space. If a tumor, or the like, is present on the side inward from the mamma, the boundary between the mamma pattern and the chest wall pattern will become distorted. Therefore, from the distortion of the boundary, it can be judged that a tumor, or the like, is present. However, as described above, the mean-level image density varies markedly for the mamma pattern and the chest wall pattern. Therefore, as in conventional techniques, when the read-out conditions for the final read-out and/or the image processing conditions are set such that a visible image may be reproduced in which the image density, or the like, of the mamma pattern is appropriate for diagnoses, the retro-mamma space does not have appropriate image quality in the reproduced visible image. In such cases, there is the risk that the presence of the tumor, or the like, on the side inward from the mamma cannot be determined.

In order for the aforesaid risk to be eliminated, a visible image should be reproduced such that both the mamma pattern and the retro-mamma space have good image quality. For this purpose, it is considered to find the image signal components of the image signal corresponding to the mamma pattern and the retro-mamma space, and to adjust the read-out conditions for the final readout and/or the image processing conditions on the basis of the thus found image signal components.

Ordinarily, in order for the image signal components corresponding to part of a radiation image, e.g. a mamma pattern in the radiation image, to be found from the image signal representing the radiation image, differentiation processing, or the like, is carried out on the image signal, and points in the radiation image, at which the image density changes, (i.e. points at which the value of the image signal changes) are thereby found. However, in the retro-mamma space, the image density (or the value of the image signal) changes little by little. Therefore, the image signal components corresponding to the retro-mamma space cannot be found by detecting a change in the image density.

The method for adjusting read-out conditions and/or image processing conditions for a mamma radiation image including a chest wall pattern and the method for adjusting image processing conditions for a mamma radiation image including a chest wall pattern in accordance with the present invention solve the aforesaid problems.

The part in the object image region, which part is primarily adjacent to the background region, is the mamma pattern. Therefore, with the method for adjusting read-out conditions and/or image processing conditions for a mamma radiation image including a chest wall pattern and the method for adjusting image processing conditions for a mamma radiation image including a chest wall pattern in accordance with the present invention, the boundary points between the object image region and the background region, i.e. the boundary points primarily between the mamma pattern and the background region, are found by detecting a change in the image signal (or the first image signal). As for the retro-mamma space, the center of gravity on the recording medium is found on the basis of the image signal components of the image signal (or the first image signal), which represent a plurality of picture elements located along a line connecting each boundary point and the edge of the recording medium, along which edge the chest wall pattern extends. Thereafter, an operation is carried out in order to find a picture element spaced apart from the position, at which the center of gravity is located, in a direction heading away from each boundary point by a distance equal to a value obtained by multiplying the distance between the position, at which the center of gravity is located, and the boundary point by a predetermined factor. In this manner, the boundary between the retro-mamma space and the region, which corresponds to part of the chest wall pattern other than the retro-mamma space and which is not related to a diagnosis, is found.

With the method for adjusting read-out conditions and/or image processing conditions for a mamma radiation image including a chest wall pattern and the method for adjusting image processing conditions for a mamma radiation image including a chest wall pattern in accordance with the present invention, the region surrounded by the boundary points and the picture elements, which have thus been found, is taken as a region of interest. The read-out conditions for the final readout and/or the image processing conditions are adjusted such that a reproduced visible image may be obtained in which the region of interest has good image quality suitable for a diagnosis. Therefore, both the mamma pattern and the retro-mamma space have good image quality in the reproduced visible image. As a result, a pattern of a tumor, or the like, which is present on the side inward from the mamma in a human body, can be detected accurately.

BRIEF DESCRIPTION OF THE DRAWINGS

FIGS. 9A through 9E are diagrams showing where prospective object image regions are located on stimulable phosphor sheets.

DESCRIPTION OF THE PREFERRED EMBODIMENTS

The present invention will hereinbelow be described in further detail with reference to the accompanying drawings.

Figure 1:
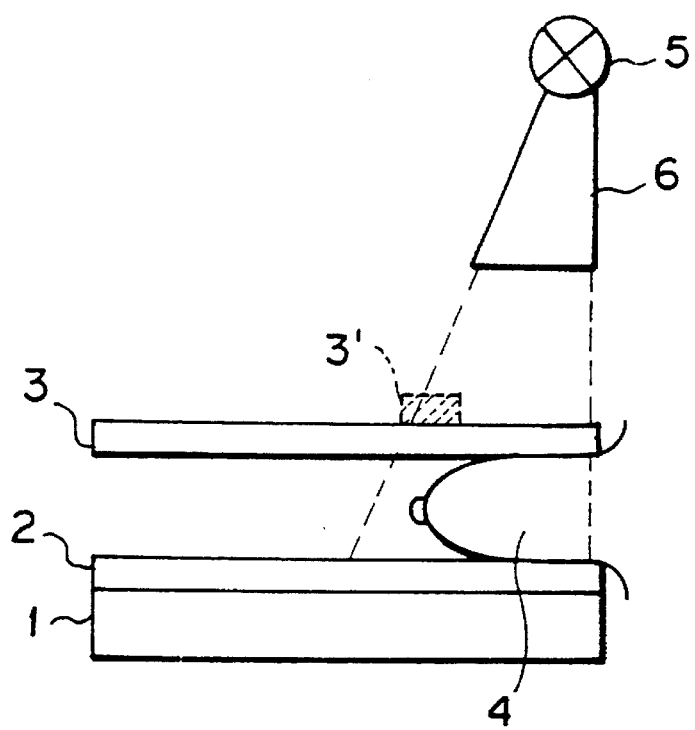
FIG. 1 is a schematic view showing an example of an X-ray image recording apparatus for recording a mamma image.

FIG. 1 is a schematic view showing an example of an X-ray image recording apparatus for recording a mamma image. In the X-ray image recording apparatus, a stimulable phosphor sheet is utilized.

With reference to FIG. 1, a cassette 2, which houses a stimulable phosphor sheet therein, is disposed on an image recording table 1. An object (a mamma) 4 is sandwiched and pressed between the cassette 2 and a holding plate 3, which may be constituted of an acrylic resin, or the like. X-rays are produced by an X-ray source 5, which is disposed above the holding plate 3. The object 4 is exposed to the X-rays, which have passed through a conical cylinder 6 having a semicircular cross-section.

Figure 2:
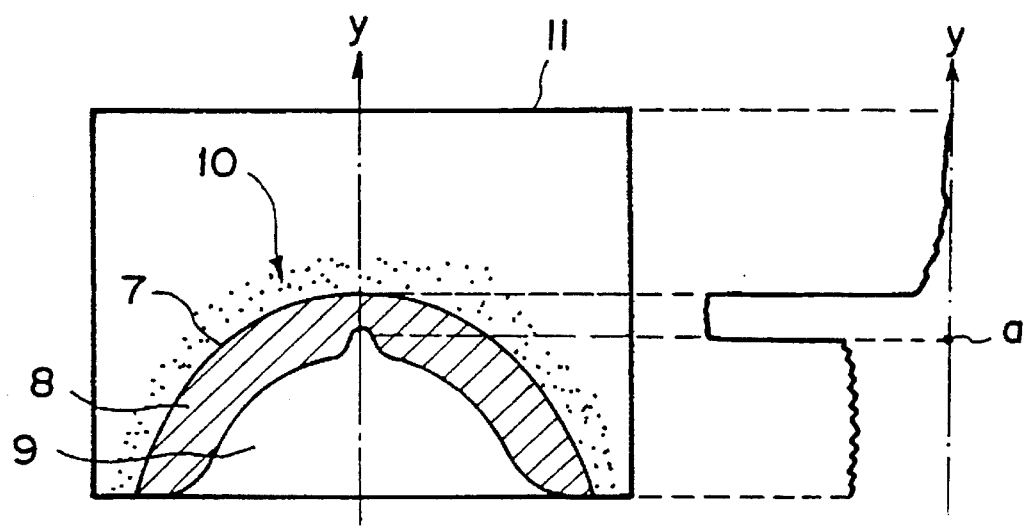
FIG. 2 is an explanatory view showing an X-ray image, which has been recorded in the X-ray image recording apparatus of FIG. 1.

FIG. 2 is an explanatory view showing an X-ray image, which has been recorded in the X-ray image recording apparatus of FIG. 1.

With reference to FIG. 2, a semicircular irradiation field 7 is present on a stimulable phosphor sheet 11. The region inside of the irradiation field 7 is constituted of a background region 8 and an object image region 9, which is surrounded by the background region 8. A scattered X-ray image region 10 (indicated by dots), which was exposed to scattered X-rays, is present on the side outward from the semicircular irradiation field 7.

The graph shown at the right part of FIG. 2 indicates the amounts of energy stored at positions located along a straight line, y, on the stimulable phosphor sheet 11 during its exposure to the X-rays. The amounts of energy stored on the stimulable phosphor sheet 11 correspond to the values of the image signal, which is detected from the X-ray image stored on the stimulable phosphor sheet, and to the levels of image density in a visible image reproduced from the image signal. As illustrated in FIG. 2, the background region 8 has the largest amounts of energy stored, the object image region 9 has the second largest amounts of energy stored, and the region outside of the irradiation field 7 has the smallest amounts of energy stored.

Figure 3:
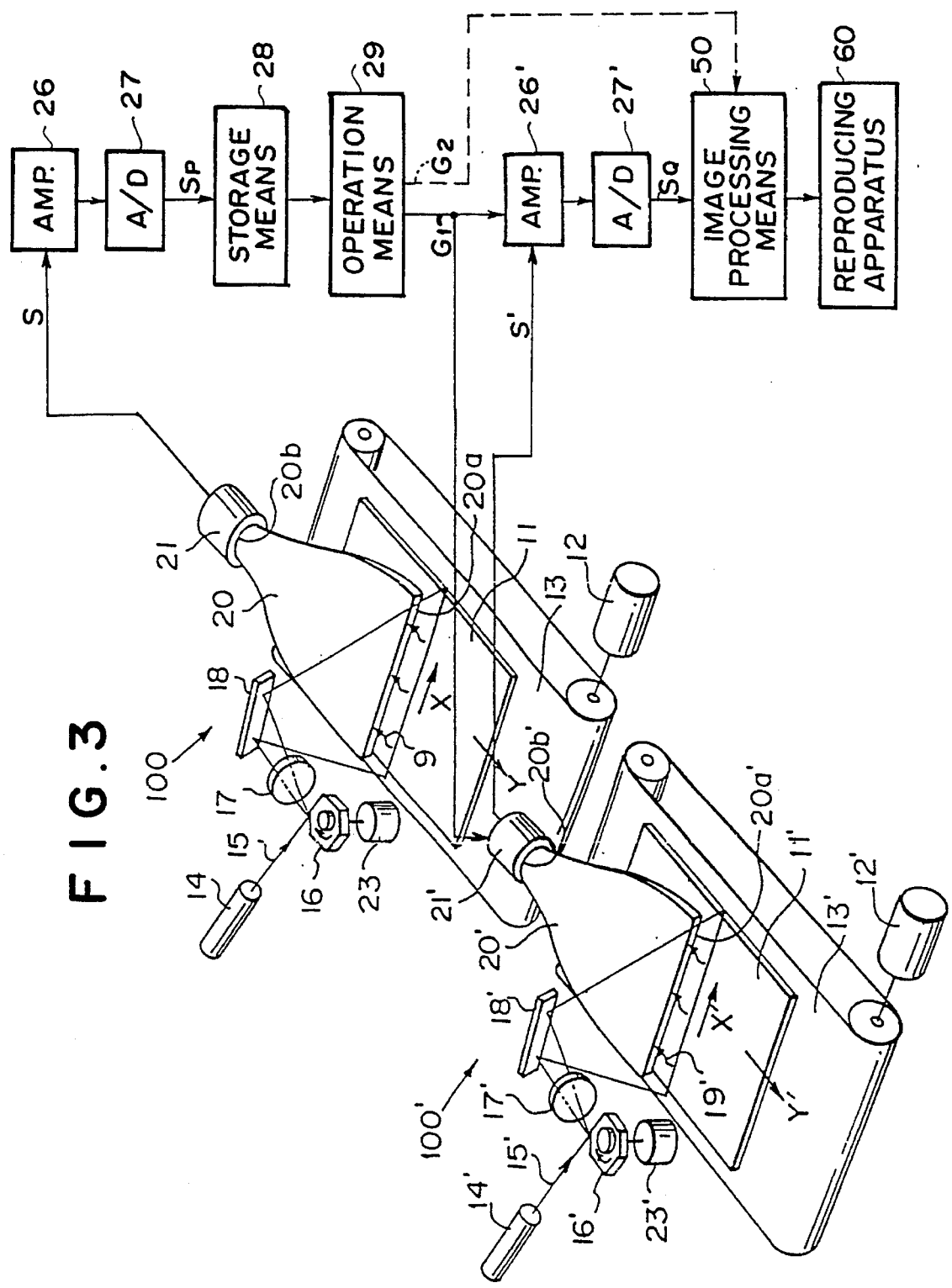
FIG. 3 is a perspective view showing an example of an X-ray image read-out apparatus, in which an embodiment of the apparatus for determining an image position in accordance with the present invention is employed.

FIG. 3 is a perspective view showing an example of an X-ray image read-out apparatus, in which an embodiment of the apparatus for determining an image position in accordance with the present invention is employed. In this embodiment, a stimulable phosphor sheet is used, and a preliminary readout is carried out.

With reference to FIG. 3, a stimulable phosphor sheet 11, on which an X-ray image having a mamma pattern embedded therein has been stored in the X-ray image recording apparatus shown in FIG. 1, is placed at a predetermined position in a preliminary read-out means 100, which carries out a preliminary readout by scanning the stimulable phosphor sheet 11 with a light beam having a low energy level, thereby releasing only part of the energy from the stimulable phosphor sheet 11, which energy was stored during its exposure to the X-rays. The stimulable phosphor sheet 11 is conveyed in a subscanning direction indicated by the arrow Y by a sheet conveyance means 13. The sheet conveyance means 13 may be constituted of an endless belt, or the like, and is operated by a motor 12. A laser beam 15 having a low energy level is produced by a laser beam source 14. The laser beam 15 is reflected and deflected by a rotating polygon mirror 16, which is quickly rotated by a motor 23 in the direction indicated by the arrow. The laser beam 15 then passes through a converging lens 17, which may be constituted of an fθ lens, or the like. The direction of the optical path of the laser beam 15 is then changed by a mirror 18, and the laser beam 15 impinges upon the stimulable phosphor sheet 11 and scans it in a main scanning direction indicated by the arrow X. The main scanning direction is approximately normal to the subscanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to the X-rays. The emitted light 19 is guided by a light guide member 20 and photoelectrically detected by a photomultiplier 21. The light guide member 20 is made from a light guiding material, such as an acrylic plate. The light guide member 20 has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the X-ray image, is converted into an electric signal by the photomultiplier 21.

An analog output signal S generated by the photomultiplier 21 is amplified by a logarithmic amplifier 26, and digitized by an A/D converter 27 into a preliminary read-out image signal SP. The preliminary read-out image signal SP takes a value proportional to the logarithmic value of the amount of the emitted light 19.

In the preliminary readout, read-out conditions, such as the voltage applied to the photomultiplier 21 or the amplification factor of the logarithmic amplifier 26, are adjusted so that image information can be detected accurately even if the amount of energy stored on the stimulable phosphor sheet 11 during its exposure to the X-rays varies over a wide range.

The preliminary read-out image signal SP obtained in the manner described above is fed into a storage means 28 and stored therein. Thereafter, the preliminary read-out image signal SP is read from the storage means 28 and fed into an operation means 29. On the basis of the preliminary read-out image signal SP, the operation means 29 determines the position of an object image region in the X-ray image, which has been stored on the stimulable phosphor sheet 11. After determining the position of the object image region, the operation means 29 calculates the read-out conditions G1 for the final readout, such as the voltage to be applied to a photomultiplier 21' or the amplification factor to be set in a logarithmic amplifier 26', on the basis of the image signal components of the preliminary read-out image signal SP, which correspond to the object image region.

A stimulable phosphor sheet 11', on which the preliminary readout has been finished, is placed at a predetermined position in the final read-out means 100' and scanned with a laser beam 15' having an energy level higher than that of the laser beam 15 used during the preliminary readout. In this manner, an image signal SQ is detected under the read-out conditions G1, which have been set in the manner described above. The configuration of the final read-out means 100' is nearly the same as that of the preliminary read-out means 100, and therefore elements corresponding to those constituting the preliminary read-out means 100 are numbered with corresponding primed reference numerals in

FIG. 3.

After the image signal SQ is digitized in an A/D converter 27', the image signal SQ is fed into an image processing means 50, which carries out appropriate image processing on the image signal SQ. After being image processed, the image signal is fed into a reproducing apparatus 60, which reproduces a visible image by use of the image signal.

How the operation means 29 determines the position of the object image region on the basis of the preliminary read-out image signal SP will be described hereinbelow.

FIGS. 4, 5A, 5B, and 5C are explanatory views showing examples of X-ray images, in which mamma patterns are embedded. In FIGS. 4, 5A, 5B, and 5C, similar elements are numbered with the same reference numerals with respect to FIG. 2.

Figure 4:
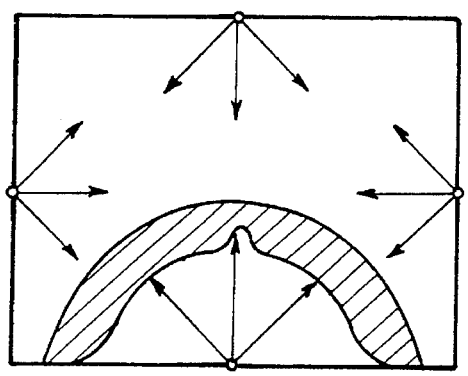
FIG. 4 is an explanatory view showing an example of an X-ray image, in which an object image region is positioned correctly.
Figure 5A:
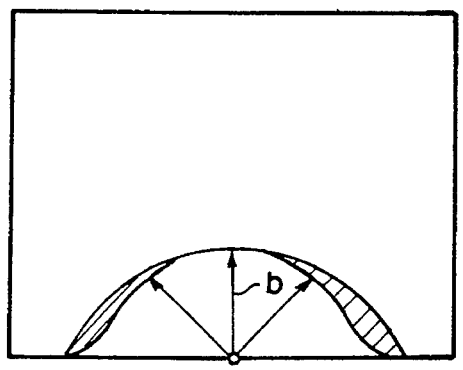
FIGS. 5A, 5B, and 5C are explanatory views showing examples of X-ray images, in which object image regions are positioned incorrectly.
Figure 5B:
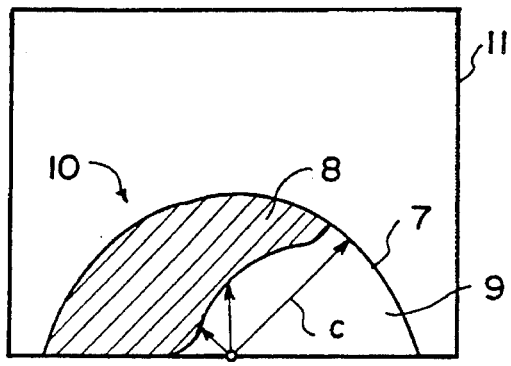
Figure 5C:
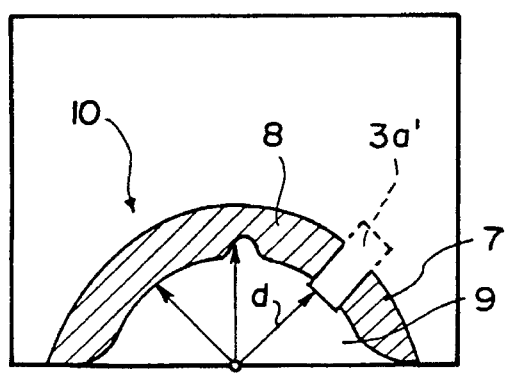

FIG. 4 shows an X-ray image, in which an object image region is positioned correctly. FIGS. 5A, 5B, and 5C are explanatory views showing examples of X-ray images, in which object image regions are positioned incorrectly. When the X-ray image of FIG. 5A was recorded, the object 4 was located incorrectly with respect to the position of the irradiation field stop (i.e. the conical cylinder 6). Therefore, a mammilla pattern is not included in the region inside of the irradiation field. In the X-ray image of FIG. 5B, the object image region is shifted horizontally from its correct position with respect to the irradiation field. When the X-ray image of FIG. 5C was recorded, a pattern 3a' of the lead plate 3' shown in FIG. 1 was recorded together. Therefore, in the X-ray image of FIG. 5C, part of the pattern 3a' extends to the object image region 9. Heretofore, the position of the object image region 9 can be determined only when the object image region 9 is positioned correctly in the X-ray image such that, as shown in FIG. 4, the background region 8 extends over the whole semicircular contour of the irradiation field. However, with the embodiment of the apparatus for determining an image position in accordance with the present invention, the position of the object image region 9 can be determined also when the object image region 9 is positioned incorrectly as shown in FIGS. 5A, 5B, and 5C.

In this embodiment, as illustrated in FIG. 4, operations for finding a change in the value of the preliminary read-out image signal SP are carried out on the image signal components of the preliminary read-out image signal SP starting with the component corresponding to the center point of each edge of the stimulable phosphor sheet and continuing with components corresponding to positions lying in each of the directions of 45°, 90°, and 135°. In this manner, a change point in the preliminary read-out image signal SP at the boundary between the object image region 9 and the background region 8 is found. The change point correspond to the point a shown in FIG. 2.

By way of example, with the method disclosed in Japanese Unexamined Patent Publication No. 61(1986)- 170178, it is determined that an object image region is present only when the change point in the preliminary read-out image signal SP has been detected for all of the three directions of 45°, 90°, and 135°. When such a method is employed, the presence of the object image region cannot be determined for the X-ray images shown in FIGS. 5A, 5B, and 5C, in which object image regions are positioned incorrectly.

Therefore, with this embodiment, a specific marking process is carried out in order to rate the presence or absence of the object image region. Specifically, when the change point in the preliminary read-out image signal SP is found for one of the directions of 45°, 90°, and 135°, two marks are given. Therefore, as for the lower edge of the stimulable phosphor sheet 11 shown in FIG. 4, six (=2+2+2) marks are given. As for the directions indicated by the arrows b, c, and d in FIGS. 5A, 5B, and 5C, the object image region 9 directly adjoins the region outside of the irradiation field without the background region 8 intervening therebetween. As illustrated in FIG. 2, the amount of energy stored on the stimulable phosphor sheet 11 (i.e. the value of the preliminary read-out image signal SP detected therefrom) is smaller in the region outside of the irradiation field than in the object image region 9. Therefore, operations for finding a change point, at which the value of the preliminary read-out image signal SP decreases sharply, are also carried out on the image signal components of the preliminary read-out image signal SP corresponding to positions lying in each of the aforesaid directions. When the change point, at which the value of the preliminary read-out image signal SP decreases sharply, is detected, a one mark is given for the change point. When any change point corresponding to the boundary between the object image region 9 and the background region 8 (to which change point, two marks are given) is not detected, nor a change point corresponding to the object image region 9 and the region outside of the irradiation field (to which change point, a one mark is given) is detected, a zero point is given as for the corresponding direction on the stimulable phosphor sheet 11.

In the manner described above, a total of the marks is calculated for each of the four edges of the stimulable phosphor sheet 11. The total marks for the four edges of the stimulable phosphor sheet 11 are compared with each other. Thereafter, it is determined that the object image region is present at the position corresponding to the edge of the stimulable phosphor sheet 11, which edge is associated with the largest total marks. In this manner, the levels of the probability that the object image region will be present are found for the respective edges of the stimulable phosphor sheet 11. The levels of the probability, which have been found for the respective edges of the stimulable phosphor sheet 11, are then compared with each other, and the position at which the object image region is present is thereby determined. Therefore, the position of the object image region can be determined more accurately than with the conventional techniques.

The directions, for which the change point in the preliminary read-out image signal SP is found, are not limited to the three directions of 45°, 90°, and 135°. For example, the change point in the preliminary read-out image signal SP may be found for more than three directions. Alternatively, the change point in the preliminary read-out image signal SP may be found with the method described below.

Figure 6:
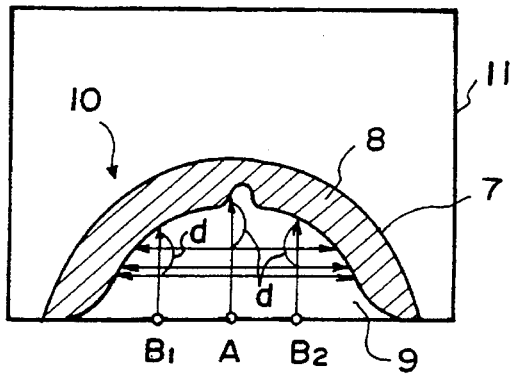
FIG. 6 is an explanatory view showing an example of an X-ray image, which is the same as that shown in FIG. 4.

FIG. 6 is an explanatory view showing an example of an X-ray image, which is the same as that shown in FIG. 4, the view serving as an aid in explaining a different example of how a change point in the preliminary read-out image signal SP is found. In FIG. 6, only the operations for finding a change point in the preliminary read-out image signal SP are shown, which are carried out starting with image signal components of the preliminary read-out image signal SP corresponding to the lower edge of the stimulable phosphor sheet 11. In this example, the operations for finding a change in the value of the preliminary read-out image signal SP are carried out on the image signal components of the preliminary read-out image signal SP starting with the components corresponding to the center point A of each edge of the stimulable phosphor sheet 11 and points B1, B2, which are located on both sides of the center point A, and continuing with components corresponding to positions lying in each of the directions, which are normal to each edge of the stimulable phosphor sheet 11. In this manner, the boundary point between the object image region 9 and the background region 8 or the boundary point between the object image region 9 and the region outside of the irradiation field is found. When the boundary point has been found, an intermediate point is then found which is spaced apart a predetermined distance d from the boundary point in the direction heading to the corresponding edge of the stimulable phosphor sheet 11. Thereafter, the operations for finding a boundary point are carried out on the image signal components of the preliminary read-out image signal SP starting with the component corresponding to the thus found intermediate point, and continuing with components corresponding to positions lying in each of the two directions, which are parallel to the corresponding edge of the stimulable phosphor sheet 11, i.e. the horizontal directions in FIG. 6. When the operations are carried out starting with each of the image signal components corresponding to the points A, B1, and B2, and the boundary points between the object image region 9 and the background region 8 are detected for the three directions, three marks are given. When the boundary points between the object image region 9 and the background region 8 are detected for the two directions parallel to each edge of the stimulable phosphor sheet 11, and at the same time a boundary point between the object image region 9 and the region outside of the irradiation field is detected for a direction which is normal to each edge of the stimulable phosphor sheet 11, two marks are given. When boundary points are detected which are located in a pattern different from the patterns described above, a one mark is given. When any boundary point is not detected, a zero mark is given. As for the operations carried out starting with the image signal components corresponding to the points B1 and B2 located on both sides of the center point A, the marks given to the point B1 or the point B2, whichever are larger, are employed. The marks are given in the manner described above to each of the points located on each edge of the stimulable phosphor sheet 11, and marks for each edge are determined in the manner listed in Table 1.

TABLE 1

| $B_1$ or $B_2$ | A | | | |
|---|---|---|---|---|
| | 0 | 1 | 2 | 3 |
| 0 | 0 | 2 | 5 | 8 |
| 1 | 1 | 3 | 9 | 12 |
| 2 | 4 | 6 | 11 | 14 |
| 3 | 7 | 10 | 13 | 15 |

For example, in cases where three marks are given to the center point A, and the marks given to the point B1 or the marks given to the point B2, whichever are larger, are two, 14 marks are given to the corresponding edge of the stimulable phosphor sheet 11 in accordance with Table 1.

In the manner described above, marks are determined for each edge of the stimulable phosphor sheet 11. It is determined that the object image region is present at the edge, which is associated with the largest marks.

The position of the object image region is determined accurately in the manner described above. Thereafter, the read-out conditions G1 for the final readout are adjusted on the basis of the image signal components of the preliminary read-out image signal SP, which correspond to the object image region.

In the aforesaid embodiment, the read-out conditions for the final readout are adjusted by the operation means 29. Alternatively, predetermined read-out conditions may be used when the final readout is carried out regardless of the characteristics of the preliminary read-out image signal SP. On the basis of the preliminary read-out image signal SP, the operation means 29 may adjust image processing conditions G2 to be used in the image processing means 50 which carries out image processing of the image signal SQ. The information representing the image processing conditions G2 calculated by the operation means 29 may then be fed into the image processing means 50 as indicated by the broken line in FIG. 3. The operation means 29 may also adjust both the read-out conditions for the final readout and the image processing conditions.

In the X-ray image read-out apparatus of FIG. 3, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary readout and the final read-out. In this case, after being subjected to the preliminary readout, the stimulable phosphor sheet 11 may be moved back to the position at which image readout is started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above, for example, a laser beam source or the like may change the intensity of the light beam.

The aforesaid embodiment is applied to the X-ray image read-out apparatus wherein the preliminary readout is carried out. However, the apparatus for determining an image position in accordance with the present invention is also applicable to X-ray image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by an operation means. The calculated image processing conditions are taken into consideration when the image signal is processed.

Also, in the aforesaid embodiment, an X-ray image of a mamma, which has been stored on a stimulable phosphor sheet, is processed. However, the apparatus for determining an image position in accordance with the present invention is not limited to embodiments wherein a mamma image is processed nor to embodiments wherein a stimulable phosphor sheet is used. The apparatus for determining an image position in accordance with the present invention is applicable widely when the position of an object image on a recording medium, on which the object image has been recorded at part, is determined.

An embodiment of the apparatus for determining a mamma image position in accordance with the present invention will be described hereinbelow.

Figure 7:
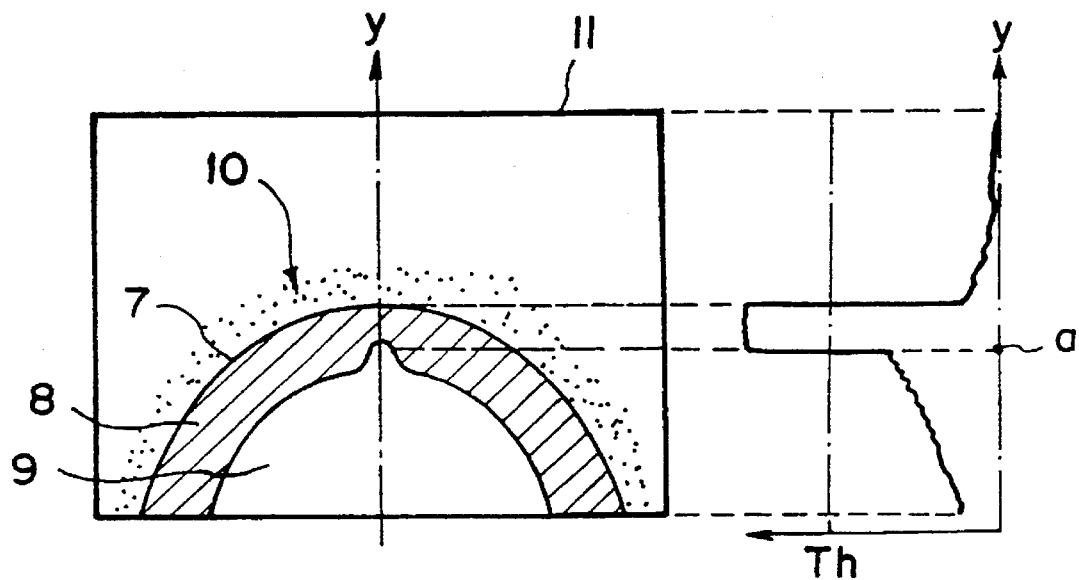
FIG. 7 is an explanatory view showing an example of an X-ray image, which has been recorded in the X-ray image recording apparatus of FIG. 1, FIGS. 8A, 8B, and 8C are explanatory views showing examples of X-ray images, in which mamma patterns are embedded.

FIG. 7 is an explanatory view showing an example of an X-ray image, which has been recorded in the X-ray image recording apparatus of FIG. 1. In FIG. 7, similar elements are numbered with the same reference numerals with respect to FIG. 2.

In this embodiment, the operation means 29 of the X-ray image read-out apparatus shown in FIG. 3 determines the position of an object image region on the basis of a preliminary read-out image signal SP in the manner described below.

Figure 8A:
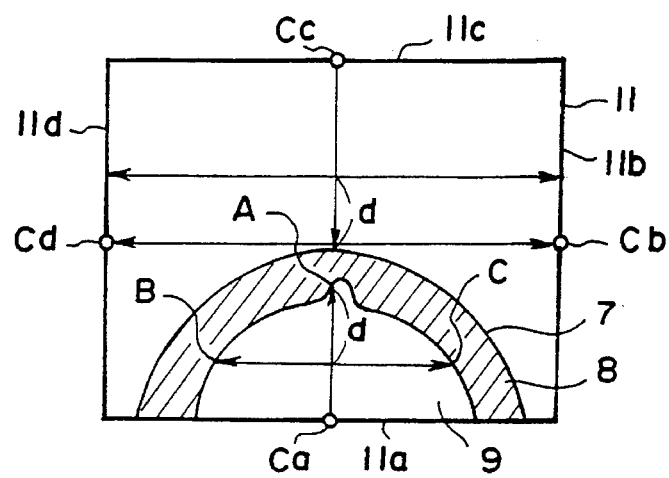
Figure 8B:
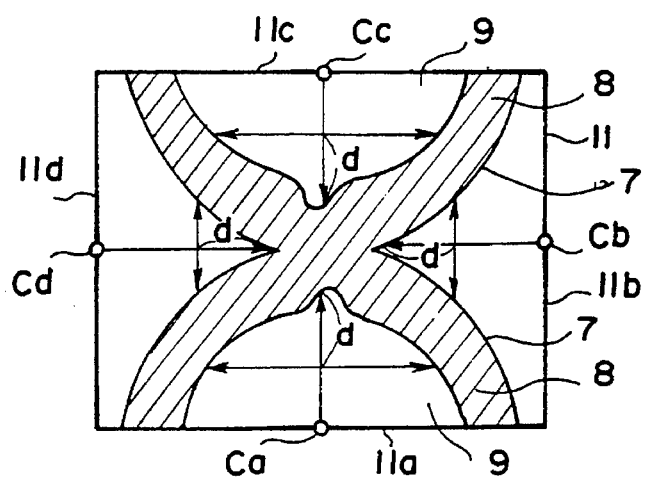
Figure 8C:
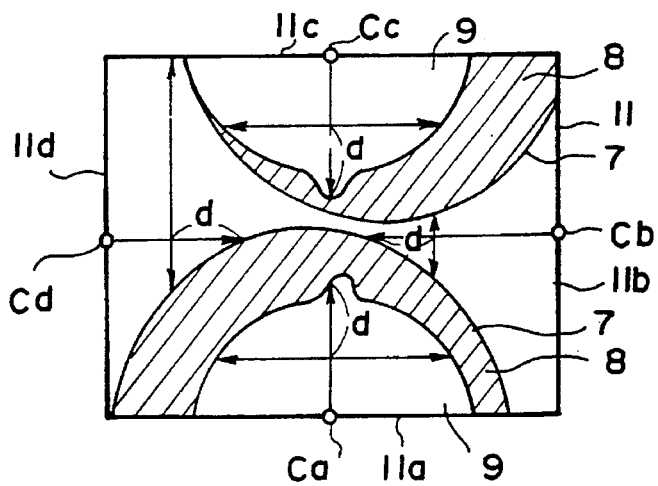

FIGS. 8A, 8B, and 8C are explanatory views showing examples of X-ray images, in which mamma patterns are embedded. In FIGS. 8A, 8B, and 8C, similar elements are numbered with the same reference numerals with respect to FIG. 7.

FIG. 8A shows an X-ray image, which has been stored on the stimulable phosphor sheet 11 and in which the pattern of only one of the right and left mammae is embedded. Each of FIGS. 8B and 8C shows an X-ray image, which has been stored on the stimulable phosphor sheet 11 and in which the patterns of the right and left mammae are embedded. In the X-ray image of FIG. 8B, parts of the two background regions 8, 8, which surround the two approximately semicircular object image regions 9, 9 are connected to each other. In the X-ray image of FIG. 8C; the upper one of the two background regions 8, 8 is slightly shifted rightwardly.

As illustrated in FIG. 8A, it often occurs that the pattern of only one of the right and left mammae is stored on the stimulable phosphor sheet 11. Also, as illustrated in FIGS. 8B and 8C, it often occurs that the patterns of the right and left mammae are stored on the stimulable phosphor sheet 11 such that they may project in approximately semicircular shapes from two edges (in these examples, the upper and lower edges) of the stimulable phosphor sheet 11, which face each other, toward the middle of the stimulable phosphor sheet 11. Moreover, as shown in FIG. 8C, it often occurs that the background region 8 is recorded at a position slightly shifted from the standard position. It also occurs that the object image region 9 is formed at a position slightly shifted from the standard position.

As illustrated in FIG. 7, the image signal components of the preliminary read-out image signal SP corresponding to the background region 8 have larger values than the image signal components corresponding to the other regions. Therefore, in this embodiment, the preliminary read-out image signal SP is converted into a binary signal by using a predetermined threshold value Th, which is shown in FIG. 7. In the binary signal, a value of 1 is assigned to the image signal components corresponding to the background region 8, and a value of 0 is assigned to the image signal components corresponding to the other regions.

Both the original X-ray image and the corresponding binary X-ray image will hereinbelow be referred to as the X-ray image. Operations for finding a change point, at which the value of the binary signal changes from 0 to 1, are then carried out on the signal components of the binary signal starting with the component corresponding to each of the center points Ca, Cb, Cc, and Cd of the edges 11a, 11b, 11c, and 11d (shown in each of FIGS. 8A, 8B, and 8C) of the binary image and continuing with components corresponding to positions lying in the direction heading to the edge of the binary image, which edge faces said edge from which the operations were started. For example, when the operations are started from the center point Ca of the lower edge 11a shown in FIG. 8A, the point A is found as the change point, at which the value of the binary signal changes from 0 to 1. When the change point, at which the value of the binary signal changes from 0 to 1, is found before the edge of the binary image is reached, which edge faces the edge from which the operations were started, an intermediate point is then found which is spaced apart a predetermined distance d from the change point in the direction heading to the center point (Ca, Cb, Cc, or Cd) from which the operations were started. Thereafter, the operations for finding a change point, at which the value of the binary signal changes from 0 to 1, are carried out on the signal components of the binary signal starting with the component corresponding to the thus found intermediate point, and continuing with components corresponding to positions lying in each of the two directions, which are parallel to the corresponding edge (11a, 11b, 11c, or 11d), on which the center point (Ca, Cb, Cc, or Cd) from which the operations were started is present. In this manner, two points are then found as the point, at which the value of the binary signal changes from 0 to 1. For example, when the operations are started from the center point Ca shown in FIG. 8A, the points B and C are thus found as the change point, at which the value of the binary signal changes from 0 to 1. When three points (A, B, and C) have been detected as the change point, at which the value of the binary signal changes from 0 to 1, it is then found that the object image region 9 is present at the corresponding edge of the binary image. Thereafter, a judgment is made as to whether the object image region 9, which has thus been found, is or is not a true object image region 9. Therefore, the object image region 9, which has thus been found, is referred to as a prospective object image region 9.

In the X-ray image of FIG. 8A, only a single prospective object image region 9 is found at the edge 11a. In the X-ray image of FIG. 8B, prospective object image regions 9, 9, 9, 9 are found at the four edges 11a, 11b, 11c, and 11d. In the X-ray image of FIG. 8C, prospective object image regions 9, 9, 9 are found at the three edges 11a, 11b, and 11c. In this embodiment, the function of the operation means 29 shown in FIG. 3 for finding the prospective object image region 9 constitutes an example of the prospective object image region finding means of the apparatus for determining a mamma image position in accordance with the present invention.

FIGS. 9A through 9E are diagrams showing where the prospective object image regions 9, 9, ..., which have been found in the manner described above, are located on stimulable phosphor sheets 11, 11, .... In each of FIGS. 9A through 9E, the square represents the stimulable phosphor sheet 11 (or the whole X-ray image stored thereon). The circle represents the prospective object image region 9.

In cases where, as shown in FIG. 9A, only a single prospective object image region 9 has been found on the stimulable phosphor sheet 11, it is directly judged that the prospective object image region 9 is a true object image region 9.

In cases where, as shown in FIG. 9B, two prospective object image regions 9, 9 have been found at two adjacent edges of the stimulable phosphor sheet 11, a calculation is made to find the mean value of the values of the image signal components of the preliminary read-out image signal SP corresponding to each of the prospective object image regions 9, 9. It is then judged that the prospective object image region 9, which is associated with a larger mean value, is a true object image region 9.

In cases where, as shown in FIG. 9C, two prospective object image regions 9, 9 have been found at two edges of the stimulable phosphor sheet 11, which edges face each other, a calculation is made to find the mean value of the values of the image signal components of the preliminary read-out image signal SP corresponding to each of the prospective object image regions 9, 9. When the mean values, which have been calculated for the prospective object image regions 9, 9, are approximately equal to each other, it is judged that the patterns of the right and left mammae are embedded in the X-ray image, i.e. that the two prospective object image regions 9, 9 are true object image regions 9, 9. When the mean values, which have been calculated for the prospective object image regions 9, 9, are markedly different from each other, it is judged that the prospective object image region 9, which is associated with a larger mean value, is a true object image region 9.

In cases where, as shown in FIG. 9D, three prospective object image regions 9, 9, 9 have been found, a calculation is made to find the first mean value of the values of the image signal components of the preliminary read-out image signal SP corresponding to the two prospective object image regions 9, 9, which have been found at the two edges of the stimulable phosphor sheet 11 facing each other. Also, a calculation is made to find the second mean value of the values of the image signal components of the preliminary read-out image signal SP corresponding to the remaining prospective object image region 9. A prospective object image region 9, which is associated with a larger mean value, is then employed. Specifically, when the first mean value is larger than the second mean value, it is judged that the two prospective object image regions 9, 9, which have been found at the two edges of the stimulable phosphor sheet 11 facing each other, are true object image regions 9, 9. When the second mean value is larger than the first mean value, it is judged that only the remaining prospective object image region 9 is a true object image region 9. As described above, in cases where the first mean value is larger than the second mean value, it may be judged directly that the two prospective object image regions 9, 9, which have been found at the two edges of the stimulable phosphor sheet 11 facing each other, are true object image regions 9, 9. Alternatively, as in the X-ray images shown in FIG. 9C, a calculation may be made to find the mean value of the values of the image signal components of the preliminary read-out image signal SP corresponding to each of the prospective object image regions 9, 9. When the mean values, which have been calculated for the prospective object image regions 9, 9, are approximately equal to each other, it may be judged that the two prospective object image regions 9, 9 are true object image regions 9, 9. When the mean values, which have been calculated for the prospective object image regions 9, 9, are markedly different from each other, it may be judged that the prospective object image region 9, which is associated with a larger mean value, is a true object image region 9.

In cases where, as shown in FIG. 9E, four prospective object image regions 9, 9, 9, 9 have been found, a calculation is made to find the mean value of the values of the image signal components of the preliminary read-out image signal SP corresponding to a set of the two prospective object image regions 9, 9, which have been found at the two edges of the stimulable phosphor sheet 11 facing each other. Also, a calculation is made to find the mean value of the values of the image signal components of the preliminary read-out image signal SP corresponding to the other set of the two prospective object image regions 9, 9, which have been found at the two edges of the stimulable phosphor sheet 11 facing each other. It is then judged that the two prospective object image regions 9, 9, which are associated with a larger mean value, are true object image regions 9, 9.

As described above, in the X-ray image of FIG. 9E, it may be judged directly that the two prospective object image regions 9, 9, which are associated with a larger mean value, are true object image regions 9, 9. Alternatively, a calculation may be made to find the mean value of the values of the image signal components of the preliminary read-out image signal SP corresponding to each of the prospective object image regions 9, 9, which are associated with a larger mean value. When the mean values, which have been calculated for the prospective object image regions 9, 9, are approximately equal to each other, it may be judged that the two prospective object image regions 9, 9 are true object image regions 9, 9. When the mean values, which have been calculated for the prospective object image regions 9, 9, are markedly different from each other, it may be judged that the prospective object image region 9, which is associated with a larger mean value, is a true object image region 9.

In this embodiment, the operation means 29 shown in FIG. 3 has the functions for calculating the mean value of the values of the image signal components of the preliminary read-out image signal SP corresponding to each prospective object image region 9, and for making a judgment from the mean value as to whether each prospective object image region 9 is or is not a true object image region 9. Such functions of the operation means 29 constitute an example of the position determining means of the first apparatus for determining a mamma image position in accordance with the present invention.

In the manner described above, the position of the object image region 9 is determined by finding a change in the preliminary read-out image signal SP at the approximately semicircular edge of the object image region 9. Thereafter, a judgment is made as to whether the object image region 9 is or is not a true object image region 9. Therefore, the position of the true object image region 9 can be determined accurately.

A judgment as to whether the object image region 9, which has been found, is or is not a true object image region 9 may be made on the basis of the mean value of the values of the image signal components of the preliminary read-out image signal SP in the manner described above. Alternatively, a judgment may be made on the basis of the geometric form, i.e. the approximately semicircular shape, of the object image region 9.

Figure 10:
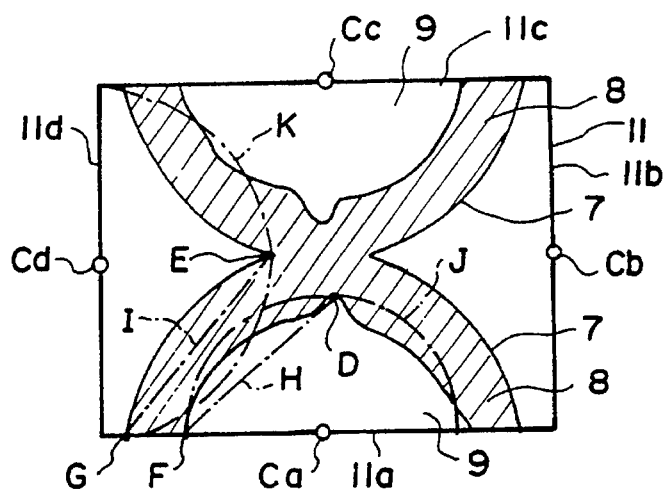
FIG. 10 is an explanatory view showing an X-ray image, which is the same as that shown in FIG. 8B, the view serving as an aid in explaining an example of how a judgment is made from the geometric form of an prospective object image region as to whether the prospective object image region, which has been found, is or is not a true object image region.

FIG. 10 is an explanatory view showing an X-ray image, which is the same as that shown in FIG. 8B, the view serving as an aid in explaining an example of how a judgment is made from the geometric form of an prospective object image region as to whether the prospective object image region, which has been found, is or is not a true object image region. From the X-ray image, as shown in FIG. 9E, four prospective object image regions 9, 9, 9, 9 are found. Operations carried out for the prospective object image region 9, which has been found at the edge 11a, and the prospective object image region 9, which has been found at the edge 11d, will be primarily described hereinbelow.

After the four prospective object image regions 9, 9, 9, 9 have been found in the manner described above, a point is found, which falls within each prospective object image region 9 and which is closest to the middle of the stimulable phosphor sheet 11. Specifically, for example, the point D is thus found for the prospective object image region 9, which has been found at the edge 11a. The point E is found for the prospective object image region 9, which has been found at the edge 11d. Also, one of the two points is found which are located on the edge of each prospective object image region 9 such that they are in contact with the corresponding edge of the stimulable phosphor sheet 11. Specifically, for example, the point F is thus found for the prospective object image region 9, which has been found at the edge 11a. The point G is found for the prospective object image region 9, which has been found at the edge 11d.

The two points are thus found for each prospective object image region 9. Thereafter, operations are carried out to find whether the values of the signal components of the binary signal corresponding to the respective picture elements located along the line, which connect the two points, are primarily 0 or 1. When the values of the signal components of the binary signal corresponding to the respective picture elements located along said line are primarily 0, it is judged that the prospective object image region 9 is a true object image region 9. Specifically, as for the prospective object image region 9, which has been found at the edge 11a, the values of the signal components of the binary signal corresponding to the respective picture elements located along the line, which connect the points D and F, are 0. Therefore, it is judged that the prospective object image region 9, which has been found at the edge 11a, is a true object image region 9. As for the prospective object image region 9, which has been found at the edge 11d, the values of the signal components of the binary signal corresponding to the respective picture elements located along the line, which connect the points E and G, are 1. Therefore, it is judged that the prospective object image region 9, which has been found at the edge 11d, is not a true object image region 9. In this manner, a judgment as to whether the object image region 9, which has been found, is or is not a true object image region 9 can be made on the basis of the geometric form, i.e. the approximately semicircular shape, of the object image region 9. With this method, the position of the object image region 9 can be determined accurately.

No limitation is imposed on how a judgment as to whether the object image region 9, which has been found, is or is not a true object image region 9 is made on the basis of the geometric form, i.e. the approximately semicircular shape, of the object image region 9. For example, after the point is found, which falls within each prospective object image region 9 and which is closest to the middle of the stimulable phosphor sheet 11, a semicircle may be drawn, which has its center at the center point Ca, Cb, Cc, or Cd of the edge 11a, 11b, 11c, or 11d corresponding to each prospective object image region 9 and which passes through the thus found point closest to the middle of the stimulable phosphor sheet 11. For example, a semicircular arc J is drawn for the prospective object image region 9 corresponding to the edge 11a shown in FIG. 11A. Also, a semicircular arc K is drawn for the prospective object image region 9 corresponding to the edge 11d. Thereafter, operations may be carried out to calculate the frequency of occurrence of a value of 0 and the frequency of occurrence of a value of 1 in the signal components of the binary signal, which correspond to the region inside of the semicircle. On the basis of the ratio of the frequency of occurrence of a value of 0 to the frequency of occurrence of a value of 1, a judgment may be made as to whether the prospective object image region 9 is or is not a true object image region 9. Any of other methods may be employed with which a judgment is made on the basis of the geometric form.

In this embodiment, the function of the operation means 29 shown in FIG. 3 for determining the position of the true object image region 9 on the basis of the geometric form constitutes an example of the position determining means of the second apparatus for determining a mamma image position in accordance with the present invention.

The operations for finding a prospective object image region 9 are not limited to those described above.

Figure 11A:
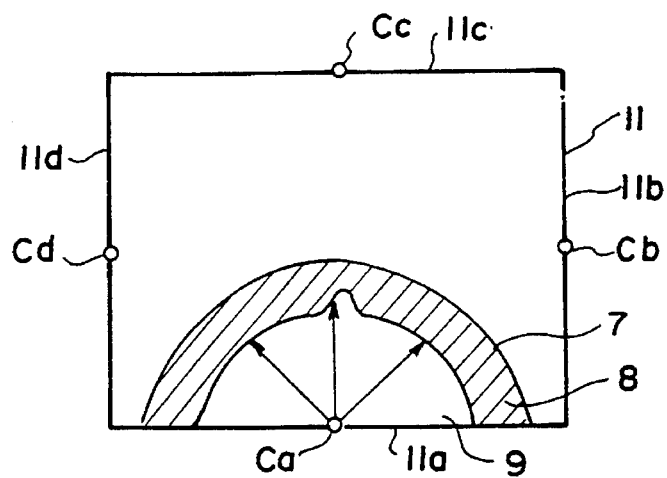
FIGS. 11A and 11B are explanatory views showing X-ray images, which are the same as that shown in FIG. 8A, the view serving as an aid in explaining different examples of how an prospective object image region is found.
Figure 11B:
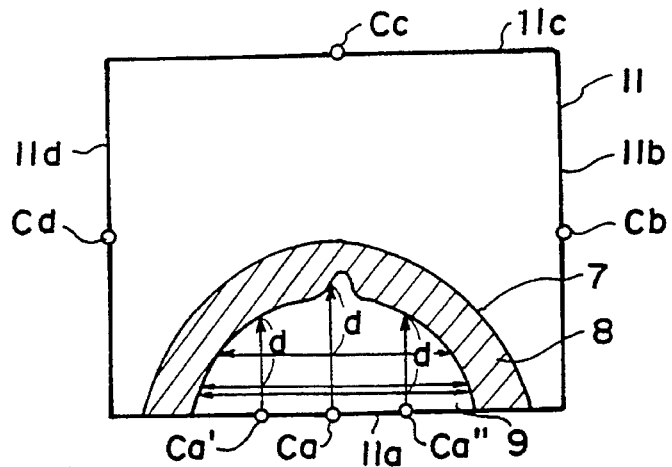

FIGS. 11A and 11B are explanatory views showing X-ray images, which are the same as that shown in FIG. 8A, the view serving as an aid in explaining different examples of how an prospective object image region 9 is found.

In FIG. 11A, operations for finding a point lying on the contour of a prospective object image region 9 are carried out on the signal components of the binary signal starting with the component corresponding to the center point Ca of the edge 11a of the stimulable phosphor sheet 11 and continuing with components corresponding to positions lying in each of the directions of 45°, 90°, and 135°. The prospective object image region 9 may also be found by carrying out such operations for each of the edges 11a, 11b, 11c, and 11d.

In FIG. 11B, in the same manner as that in the aforesaid embodiment, operations for finding points lying on the contour of a prospective object image region 9 are carried out on the signal components of the binary signal starting with the component corresponding to the center point Ca of the edge 11a of the stimulable phosphor sheet 11. Also, in the same manner, operations for finding points lying on the contour of a prospective object image region 9 are carried out on the signal components of the binary signal starting with each of the components corresponding to the points Ca' and Ca", which are located on both sides of the center point Ca. In this case, at most nine contour points are found. In cases where only eight points or fewer points can be found, a judgment as to the presence or absence of an object image region 9 is made by utilizing predetermined algorithms.

Alternatively, any of operations other than those described above may be employed. The prospective object image region finding means of the first and second apparatuses for determining a mamma image position in accordance with the present invention may employ any of operation methods, with which a change in the image signal at the edge of the object image region can be found. In the aforesaid embodiments of the first and second apparatuses for determining a mamma image position in accordance with the present invention, the preliminary read-out image signal SP is converted into a binary signal. Alternatively, instead of the binary signal being generated, a prospective object image region may be found on the basis of the preliminary read-out image signal SP.

After the position of the object image region is determined accurately, the read-out conditions G1 for the final readout are adjusted on the basis of the image signal components of the preliminary read-out image signal SP corresponding to the object image region.

In the aforesaid embodiments of the first and second apparatuses for determining a mamma image position in accordance with the present invention, the X-ray image of a mamma, which has been stored on a stimulable phosphor sheet, is processed. However, the first and second apparatuses for determining a mamma image position in accordance with the present invention are not limited to apparatuses in which stimulable phosphor sheets are utilized, but are also applicable when other recording media, such as sheets of X-ray sensitive silver halide film, are used.

An embodiment of the method for adjusting read-out conditions and/or image processing conditions for a radiation image in accordance with the present invention will be described hereinbelow.

Figure 12A:
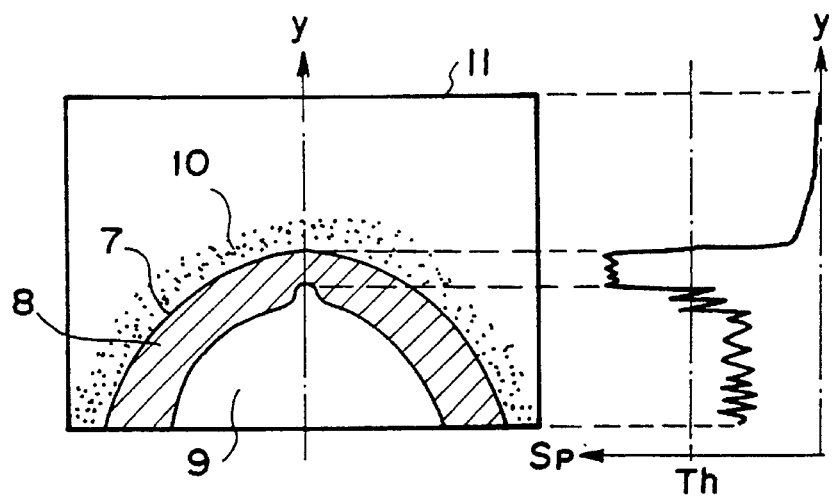
FIGS. 12A, 12B, and 12C are explanatory views showing examples of X-ray images, which have been recorded in the X-ray image recording apparatus of FIG. 1, FIGS. 13A and 13B are explanatory views showing examples of X-ray images, in which mamma patterns are embedded, the views serving as an aid in explaining how a region, which approximately corresponds to an object image, is found.
Figure 12C:
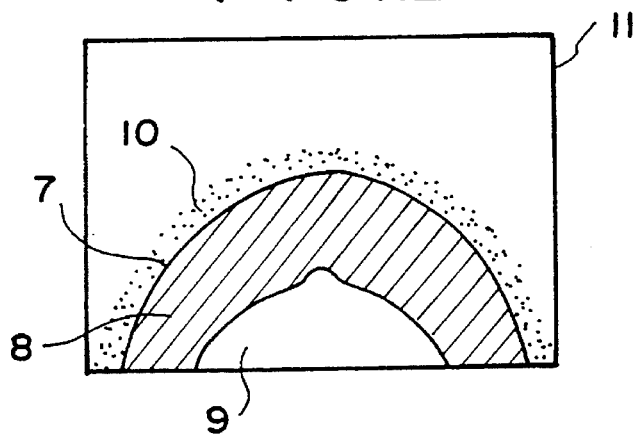
Figure 12B:
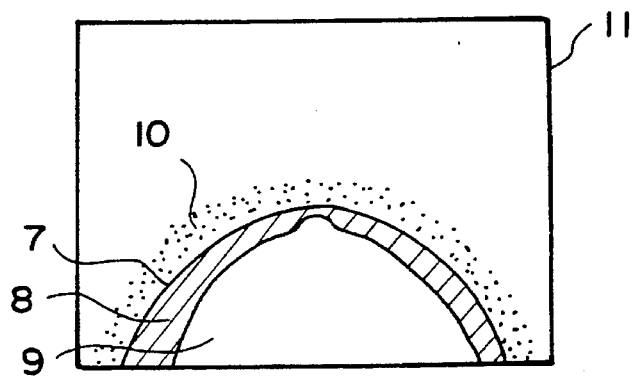

FIGS. 12A, 12B, and 12C are explanatory views showing examples of X-ray images, which have been recorded in the X-ray image recording apparatus of FIG. 1. In FIGS. 12A, 12B, and 12C, similar elements are numbered with the same reference numerals with respect to FIG. 2. As illustrate at the right part of FIG. 12A, the preliminary read-out image signal SP include much noise components due to, for example, the sway in the X-rays used during the recording of the X-ray image.

FIG. 12A shows the X-ray image having a standard pattern. As illustrated in FIG. 12B, it often occurs that an X-ray image is recorded such that the area of the background region 8 is markedly small and the area of the object image 9 is comparatively large. Also, as illustrated in FIG. 12C, it often occurs that an X-ray image is recorded such that the area of the background region 8 is markedly large and the area of the object image 9 is small. With the method for adjusting read-out conditions and/or image processing conditions for a radiation image in accordance with the present invention, even if the ratio of the area of the object image 9 to the area of the background region 8 varies markedly for different X-ray images, the probability density functions of the preliminary read-out image signals SP can be obtained, which functions have patterns close to a standard pattern.

In this embodiment, the operation means 29 of the X-ray image read-out apparatus shown in FIG. 3 determines the position of an object image on the basis of the preliminary read-out image signal SP in the manner described below.

Figure 13A:
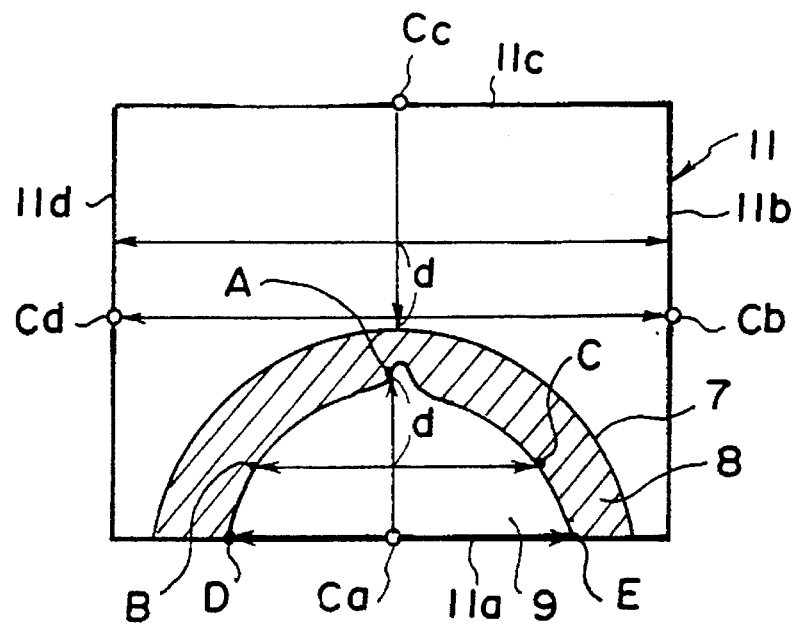
Figure 13B:
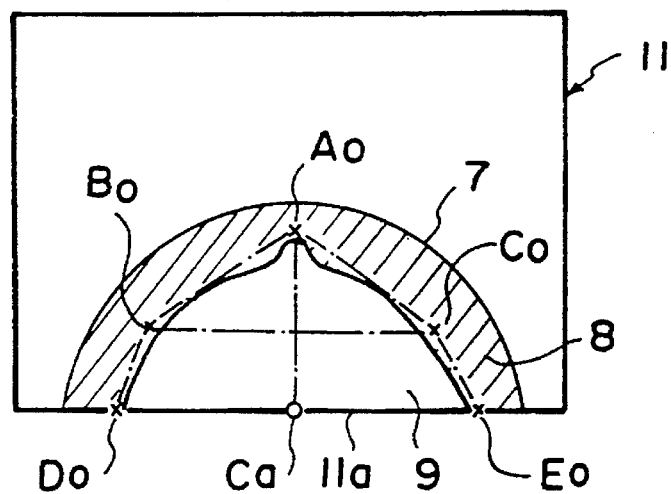

FIGS. 13A and 13B are explanatory views showing examples of X-ray images, in which mamma patterns are embedded, the views serving as an aid in explaining how a region, which approximately corresponds to an object image, is found. In FIGS. 13A and 13B, similar elements are numbered with the same reference numerals with respect to FIGS. 12A, 12B, and 12C.

As illustrated in FIG. 12A, the image signal components of the preliminary read-out image signal SP corresponding to the background region 8 have larger values than the image signal components corresponding to the other regions. Therefore, in this embodiment, the preliminary read-out image signal SP is converted into a binary signal by using a predetermined threshold value Th, which is shown in FIG. 12A. In the binary signal, a value of 1 is assigned to the image signal components corresponding to the background region 8, and a value of 0 is assigned to the image signal components corresponding to the other regions.

Both the original X-ray image and the corresponding binary X-ray image will hereinbelow be referred to as the X-ray image. Operations for finding a change point, at which the value of the binary signal changes from 0 to 1, are then carried out on the signal components of the binary signal starting with the component corresponding to each of the center points Ca, Cb, Cc, and Cd of the edges 11a, 11b, 11c, and 11d (shown in FIG. 13A) of the binary image and continuing with components corresponding to positions lying in the direction heading to the edge of the binary image, which edge faces said edge from which the operations were started. For example, when the operations are started from the center point Ca of the lower edge 11a shown in FIG. 13A, the point A is found as the change point, at which the value of the binary signal changes from 0 to 1. When the change point, at which the value of the binary signal changes from 0 to 1, is found before the edge of the binary image is reached, which edge faces said edge from which the operations were started, an intermediate point is then found which is spaced apart a predetermined distance d from the change point in the direction heading to the center point (Ca, Cb, Cc, or Cd) from which the operations were started. Thereafter, the operations for finding a change point, at which the value of the binary signal changes from 0 to 1, are carried out on the signal components of the binary signal starting with the component corresponding to the thus found intermediate point, and continuing with components corresponding to positions lying in each of the two directions, which are parallel to the corresponding edge (11a, 11b, 11c, or 11d), on which the center point (Ca, Cb, Cc, or Cd) from which the operations were started is present. In this manner, two points are then found as the point, at which the value of the binary signal changes from 0 to 1. For example, when the operations are started from the center point Ca shown in FIG. 13A, the points B and C are thus found as the change point, at which the value of the binary signal changes from 0 to 1. When three points (A, B, and C) have been detected as the change point, at which the value of the binary signal changes from 0 to 1, it is then found that the object image 9 is present at the corresponding edge of the binary image. After it is found that the object image 9 is present at the edge 11a, the operations for finding a change point, at which the value of the binary signal changes from 0 to 1, are carried out on the signal components of the binary signal corresponding to the edge 11a. From the operations, the points D and E are found. In this manner, a plurality of the points A through E are found. Thereafter, points Ao through Eo are found which are spaced a distance 1 from the points A through E to the side outward from the object image 9.

Figure 14:
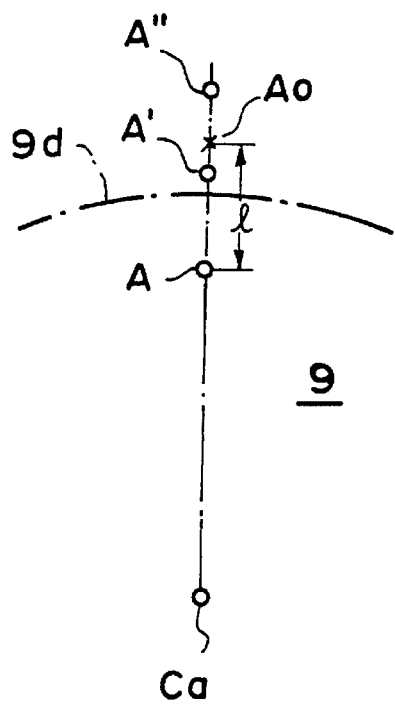
FIG. 14 is an enlarged view showing part of the X-ray image shown in FIG. 13A.

FIG. 14 is an enlarged view showing part of the X-ray image shown in FIG. 13A.

As described above with reference to FIG. 12A, the preliminary read-out image signal SP includes much noise components. Therefore, as shown in FIG. 14, it often occurs that the point A, which has been found in the manner described above, is located on the side inward from the edge 9d of the object image 9. Also, as indicated by points A' and A" in FIG. 14, it often occurs that the point, which has been found in the manner described above, is located on the side outward from the edge 9d of the object image 9. Therefore, such that a point may be found which is located in the vicinity of and on the side outward from the edge 9d of the object image 9, the point A, which has been found in the manner described above, is shifted a distance 1 to the side outward from the object image 9, and the point Ao is thereby found. As for the points B through E, the points Bo through Eo are found in the same manner.

As shown in FIG. 13B, after the points Ao through Eo are thus found, they are connected to each other by a zigzag line. The region surrounded by the zigzag line is taken as the region approximately corresponding to the object image 9 is found. The region thus found includes the object image 9 and is surrounded by the lines extending approximately along the edge of the object image 9. As described above, the lines connecting the points Ao through Eo are not limited to the zigzag line.

Figure 15:
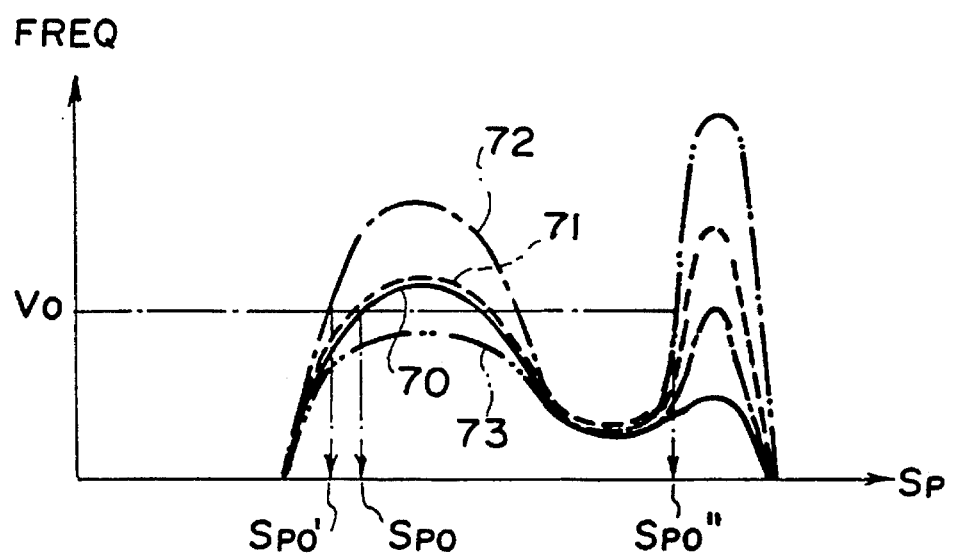
FIG. 15 is a graph showing the probability density functions of preliminary read-out image signals.

FIG. 15 is a graph showing an example of the probability density function of the image signal components of the preliminary read-out image signal SP corresponding to the thus found region, which approximately corresponds to the object image 9, and examples of the probability density functions of the image signal components of the preliminary read-out image signals SP corresponding to the regions inside of the irradiation fields 7, 7, 7 in the X-ray images shown in FIGS. 12A, 12B, and 12C. The probability density functions shown in FIG. 15 have been normalized with the areas of the region, which approximately corresponds to the object image 9, and the regions inside of the irradiation fields 7, 7, 7 in the X-ray images shown in FIGS. 12A, 12B, and 12C.

Probability density functions 71, 72, and 73 correspond respectively to the X-ray images shown in FIGS. 12A, 12B, and 12C. The ratio of the area of the object image 9 to the area of the background region 8 varies markedly for the X-ray images of FIGS. 12B and 12C. Therefore, the patterns of the probability density functions 72 and 73 differ markedly from each other. Problems will be described hereinbelow which are encountered when, for example, the smallest value of the preliminary read-out image signal SP occurring with a frequency Vo is found. In the probability density function 71, which corresponds to the X-ray image having a standard pattern as shown in FIG. 12A, and the probability density function 70 of the image signal components of the preliminary read-out image signal SP corresponding to the region found in the manner described above, which region approximately corresponds to the object image 9, a point SPo on the horizontal axis, on which the values of the preliminary read-out image signal SP are plotted, is found as the point corresponding to the frequency Vo. However, in the probability density function 72, which corresponds to the X-ray image shown in FIG. 12B, a point SPo' on the horizontal axis is found as the point corresponding to the frequency Vo. As a result, errors occur in setting the read-out conditions for the final readout. Also, in the probability density function 73, which corresponds to the X-ray image shown in FIG. 12C, a point SPo" on the horizontal axis is found as the point corresponding to the frequency Vo. In this case, values of the read-out conditions for the final readout are determined which are markedly different from correct values. In the worst case, it becomes necessary for a new X-ray image to be recorded.

On the other hand, the probability density function 70 is obtained from the image signal components of the preliminary read-out image signal SP corresponding to the region, which approximately corresponds to the object image 9. Therefore, even if, as shown in FIGS. 12B and 12C, the ratio of the area of the object image 9 to the area of the background region 8 varies markedly for different X-ray images, the probability density functions of the preliminary read-out image signals SP can be obtained, which functions have patterns close to a standard pattern. For example, when points corresponding to the frequency Vo are found from the probability density functions of the preliminary read-out image signals SP representing different X-ray images, the point SPo is always found as such points. Therefore, read-out conditions for the final readout can be set to values appropriate for every X-ray image.

After the probability density function of the image signal components of the preliminary read-out image signal SP corresponding to the region, which approximately corresponds to the object image 9, is created in the manner described above, the read-out conditions G1 for the final readout are adjusted accurately on the basis of the results of an analysis of the probability density function.

No limitation is imposed on how the points A through E lying on the edge of the object image 9 are found. For example, the points A through E may be found with the technique described below.

FIGS. 11A and 11B are explanatory views showing X-ray images, which are the same as that shown in FIG. 13A, the view serving as an aid in explaining different examples of how a plurality of points lying on the edge of the object image 9 are found.

In FIG. 11A, operations for finding a point lying on the edge of an object image 9 are carried out on the signal components of the binary signal starting with the component corresponding to the center point Ca of the edge 11a of the stimulable phosphor sheet 11 and continuing with components corresponding to positions lying in each of the directions of 45°, 90°, and 135°. The region approximately corresponding to the object image 9 may also be found by carrying such operations for each of the edges 11a, 11b, 11c, and 11d.

In FIG. 11B, in the same manner as that in the aforesaid embodiment, operations for finding points lying on the edge of an object image 9 are carried out on the signal components of the binary signal starting with the component corresponding to the center point Ca of the edge 11a of the stimulable phosphor sheet 11. Also, in the same manner, operations for finding points lying on the edge of an object image 9 are carried out on the signal components of the binary signal starting with each of the components corresponding to the points Ca' and Ca", which are located on both sides of the center point Ca. In this case, at most nine points lying on the edge of the object image 9 are found. In cases where only eight points or fewer points can be found, the region approximately corresponding to the object image 9 is found on the basis of the eight or fewer points.

Alternatively, any of operations other than those described above may be employed in order to find the region approximately corresponding to the object image 9. In the aforesaid embodiment of the method for adjusting read-out conditions and/or image processing conditions for a radiation image in accordance with the present invention, preliminary read-out image signal SP is converted into a binary signal. Alternatively, instead of the binary signal being generated, points lying on the edge of the object image 9 may be found on the basis of the preliminary read-out image signal SP.

In the aforesaid embodiment of the method for adjusting read-out conditions and/or image processing conditions for a radiation image in accordance with the present invention, the read-out conditions for the final readout are adjusted by the operation means 29. Alternatively, predetermined read-out conditions may be used when the final readout is carried out regardless of the characteristics of the preliminary read-out image signal SP. On the basis of the preliminary read-out image signal SP, the operation means 29 may adjust image processing conditions G2 to be used in the image processing means 50 which carries out image processing of the image signal SQ. The information representing the image processing conditions G2 calculated by the operation means 29 may then be fed into the image processing means 50 as indicated by the broken line in FIG. 3. The operation means 29 may also adjust both the read-out conditions for the final readout and the image processing conditions.

The aforesaid embodiment of the method for adjusting read-out conditions and/or image processing conditions for a radiation image in accordance with the present invention is applied to the X-ray image read-out apparatus wherein the preliminary readout is carried out. However, the method for adjusting read-out conditions and/or image processing conditions for a radiation image in accordance with the present invention is also applicable to X-ray image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by an operation means. The calculated image processing conditions are taken into consideration when the image signal is processed.

Also, in the aforesaid embodiment of the method for adjusting read-out conditions and/or image processing conditions for a radiation image in accordance with the present invention, an X-ray image of a mamma, which has been stored on a stimulable phosphor sheet, is processed. However, the method for adjusting read-out conditions and/or image processing conditions for a radiation image in accordance with the present invention is not limited to embodiments wherein a mamma image is processed nor to embodiments wherein a stimulable phosphor sheet is used. The method for adjusting read-out conditions and/or image processing conditions for a radiation image in accordance with the present invention is applicable widely when the read-out conditions for the final readout and/or the image processing conditions are adjusted on the basis of an image signal obtained by reading out an image from a recording medium, on which an object image has been recorded at part.

An embodiment of the method for adjusting read-out conditions and/or image processing conditions for a mamma radiation image including a chest wall pattern in accordance with the present invention will be described hereinbelow.

Figure 16:
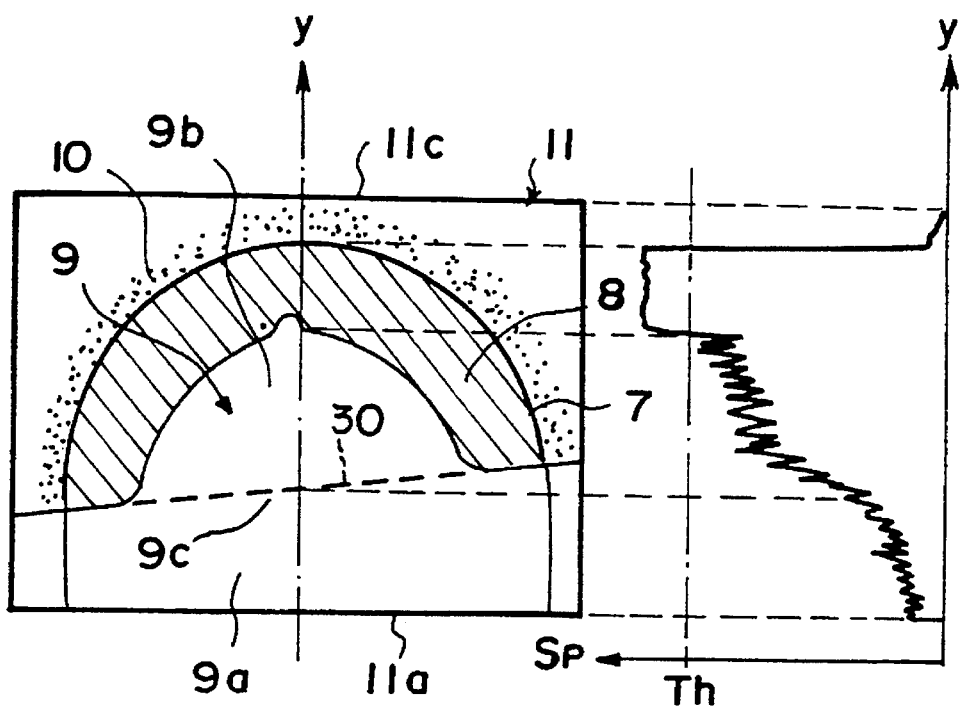
FIG. 16 is an explanatory view showing an example of an X-ray image, which has been recorded in the X-ray image recording apparatus of FIG. 1, FIGS. 17A and 17B are explanatory views showing examples of X-ray images, in which mamma patterns are embedded, the views serving as an aid in explaining an example of how a region, which approximately corresponds to an object image, is found.

FIG. 16 is an explanatory view showing an example of an X-ray image, which has been recorded in the X-ray image recording apparatus of FIG. 1.

With reference to FIG. 16, a semicircular irradiation field 7 is present on a stimulable phosphor sheet 11. The region inside of the irradiation field 7 is constituted of a background region 8 and the region corresponding to an object image 9. The object image 9 is composed of a chest wall pattern 9a, which extends along an edge 11a of the stimulable phosphor sheet 11, and a mamma pattern 9b, which projects in an approximately semicircular shape from the chest wall pattern 9a toward an edge 11c. The boundary region between the chest wall pattern 9a and the mamma pattern 9b, i.e. the region in the vicinity of the broken line 30, is referred to as a retro-mamma space 9c.

A scattered X-ray image region 10 (indicated by dots), which was exposed to scattered X-rays, is present on the side outward from the semicircular irradiation field 7.

The graph shown at the right part of FIG. 16 indicates the amounts of energy stored at positions located along a straight line, y, on the stimulable phosphor sheet 11 during its exposure to the X-rays. The amounts of energy stored on the stimulable phosphor sheet 11 correspond to the values of the preliminary read-out image signal SP, which is detected during a preliminary readout from the X-ray image stored on the stimulable phosphor sheet, and to the levels of image density in a visible image reproduced on the basis of the preliminary read-out image signal SP. As illustrated in FIG. 16, the background region 8 has the largest mean value of the amounts of energy stored, the region corresponding to the object image 9 has the second largest mean value of the amounts of energy stored, and the region outside of the irradiation field 7 has the smallest mean value of the amounts of energy stored. In the region corresponding to the object image 9, the amounts of energy stored are comparatively larger in the region corresponding to the mamma pattern 9b than in the region corresponding to the chest wall pattern 9a. Also, in the retro-mamma space 9c, the amounts of energy stored change comparatively gradually. The preliminary read-out image signal SP includes much noise components due to the sway in the X-rays used during the recording of the X-ray image.

In this embodiment, the operation means 29 of the X-ray image read-out apparatus shown in FIG. 3 finds a region of interest in the X-ray image, which has been stored on the stimulable phosphor sheet 11, on the basis of the preliminary read-out image signal SP. The region of interest is composed of the mamma pattern 9b and the retro-mamma space 9c. How the region of interest is found will be described later. After the region of interest is found, read-out conditions G1 for the final readout are adjusted on the basis of the image signal components of the preliminary read-out image signal SP corresponding to the region of interest.

How the operation means 29 finds the region of interest on the basis of the preliminary read-out image signal SP will be described hereinbelow.

Figure 17A:
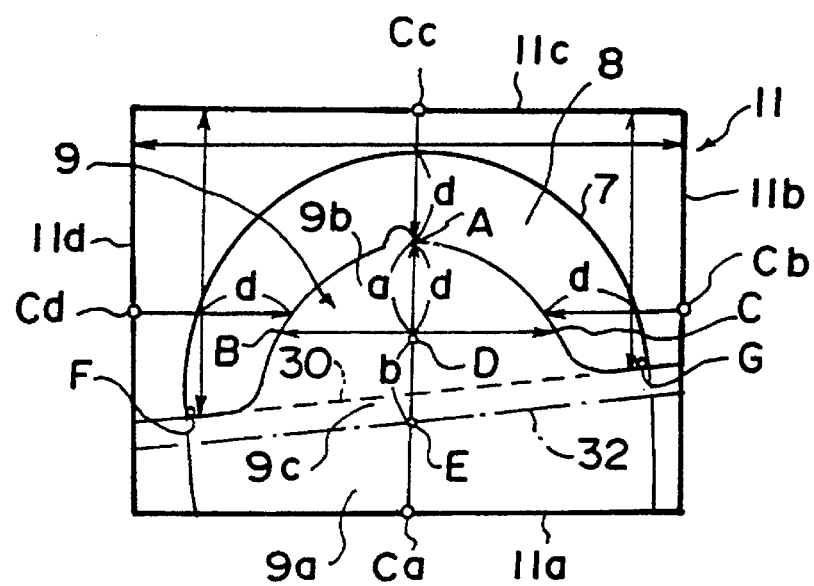
Figure 17B:
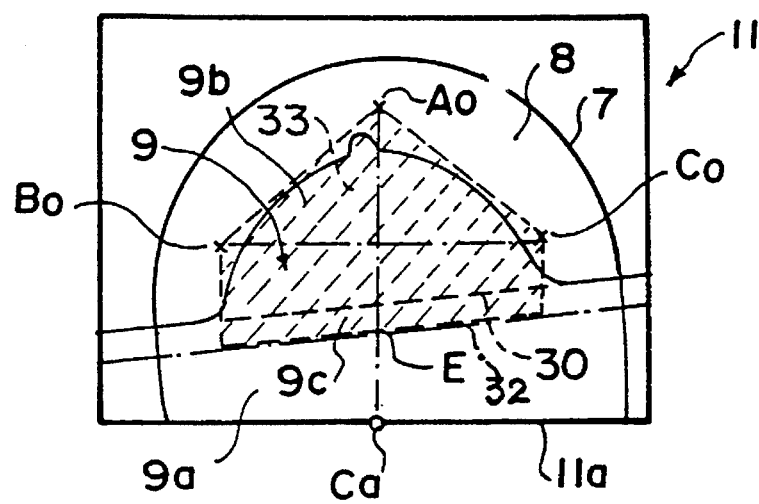

FIGS. 17A and 17B are explanatory views showing examples of X-ray images, in which mamma patterns are embedded, the views serving as an aid in explaining an example of how a region of interest is found. In FIGS. 17A and 17B, similar elements are numbered with the same reference numerals with respect to FIG. 16.

As illustrated in FIG. 16, the image signal components of the preliminary read-out image signal SP corresponding to the background region 8 have larger values than the image signal components corresponding to the other regions. Therefore, in this embodiment, the preliminary read-out image signal SP is converted into a binary signal by using a predetermined threshold value Th, which is shown in FIG. 16. In the binary signal, a value of 1 is assigned to the image signal components corresponding to the background region 8, and a value of 0 is assigned to the image signal components corresponding to the other regions.

Both the original X-ray image and the corresponding binary X-ray image will hereinbelow be referred to as the X-ray image. Operations for finding a change point, at which the value of the binary signal changes from 0 to 1, are then carried out on the signal components of the binary signal starting with the component corresponding to each of the center points Ca, Cb, Cc, and Cd of the edges 11a, 11b, 11c, and 11d (shown in FIG. 17A) of the binary image and continuing with components corresponding to positions lying in the direction heading to the edge of the binary image, which edge faces said edge from which the operations were started. For example, when the operations are started from the center point Ca of the lower edge 11a shown in FIG. 17A, the point A is found as the change point, at which the value of the binary signal changes from 0 to 1. When the change point, at which the value of the binary signal changes from 0 to 1, is found before the edge of the binary image is reached, which edge faces said edge from which the operations were started, an intermediate point is then found which is spaced apart a predetermined distance d from the change point in the direction heading to the center point (Ca, Cb, Cc, or Cd) from which the operations were started. Thereafter, the operations for finding a change point, at which the value of the binary signal changes from 0 to 1, are carried out on the signal components of the binary signal starting with the component corresponding to the thus found intermediate point, and continuing with components corresponding to positions lying in each of the two directions, which are parallel to the corresponding edge (11a, 11b, 11c, or 11d), on which the center point (Ca, Cb, Cc, or Cd) from which the operations were started is present. In this manner, two points are then found as the point, at which the value of the binary signal changes from 0 to 1. For example, when the operations are started from the center point Ca shown in FIG. 17A, the points B and C are thus found as the change point, at which the value of the binary signal changes from 0 to 1. When three points (A, B, and C) have been detected as the change point, at which the value of the binary signal changes from 0 to 1, it is then found that the object image 9 is present at the corresponding edge of the binary image. After a plurality of the points A, B, and C are found, points Ao, Bo, and Co are found which are spaced a distance P from the points A, B, and C to the side outward from the object image 9.

FIG. 14 is an enlarged view showing part of the X-ray image shown in FIG. 17A.

As described above with reference to FIG. 16, the preliminary read-out image signal SP includes much noise components. Therefore, as shown in FIG. 14, it often occurs that the point A, which has been found in the manner described above, is located on the side inward from the edge 9d of the object image 9. Also, as indicated by points A' and A" in FIG. 14, it often occurs that the point, which has been found in the manner described above, is located on the side outward from the edge 9d of the object image 9. Therefore, such that a point may be found which is located in the vicinity of and on the side outward from the edge 9d of the object image 9, the point A, which has been found in the manner described above, is shifted a distance 1 to the side outward from the object image 9, and the point Ao is thereby found. As for the points B and C, the points Bo and Co are found in the same manner. After the points Ao, Bo, and Co are thus found, the mamma pattern 9b can be surrounded by straight lines or a curve connecting these points. The term "boundary points" as used herein for the method for adjusting read-out conditions and/or image processing conditions for a mamma radiation image including a chest wall pattern in accordance with the present invention is not limited to the points A, B, and C found in this embodiment, but embraces various other points, e.g. the points Ao, Bo, and Co.

An example of how a picture element, which is located at the boundary between the retro-mamma space 9c and the part of the chest wall pattern 9a other than the retro-mamma space 9c, is found will be described hereinbelow.

The center of gravity D on the stimulable phosphor sheet 11 is found on the basis of the image signal components of the preliminary read-out image signal SP, which represent a plurality of picture elements located along a straight line connecting the thus found boundary point A or Ao and the center point Ca of the edge 11a of the stimulable phosphor sheet 11. As indicated by the profile of the preliminary read-out image signal SP shown in FIG. 16, the values of the image signal components of the preliminary read-out image signal SP corresponding to the chest wall pattern 9a are markedly smaller than the values of the image signal components corresponding to the mamma pattern 9b. Therefore, of the image signal components of the preliminary read-out image signal SP, which represent a plurality of picture elements located along the line connecting the thus found boundary point A or Ao and the center point Ca of the edge 11a of the stimulable phosphor sheet 11, the image signal components of the preliminary read-out image signal SP, which represent a plurality of picture elements located in the region corresponding to the chest wall pattern 9a, make little contribution to the results of the operations for finding the center of gravity D. Accordingly, the thus found center of gravity D is located in the vicinity of the middle of the mamma pattern 9b. In this embodiment, the center of gravity is found on the basis of the preliminary read-out image signal SP, the value of which is proportional to the logarithmic value of the amount of light emitted by the stimulable phosphor sheet 11. Alternatively, the center of gravity may be found on the basis of the signal, the value of which is proportional to the amount of light emitted by the stimulable phosphor sheet 11.

After the center of gravity D is found in the manner described above, operations are carried out in order to find a picture element E spaced apart from the position, at which center of gravity D is located, in a direction heading to the center point Ca by a distance equal to a value, b (b=a·η), obtained by multiplying the distance, a, between the boundary point A or Ao and the position, at which the center of gravity D is located, by a predetermined factor h. The value of the factor h is predetermined such that the thus found picture element E may lie at the boundary between the retro-mamma space 9c and the part of the chest wall pattern 9a other than the retro-mamma space 9c. The picture element E is found in the manner described above, and points F and G, which are located at the boundary of the irradiation field 7 and, at the same time, at the boundary between the object image 9 and the background region 8, are found. Thereafter, a line 32 is found, which is parallel to the line passing through the point E and connecting the two points F and G.

As shown in FIG. 17B, after the points Ao, Bo, Co, the point E, and the line 32 are found in the manner described above, a region 33 is found which is surrounded by the points Ao, Bo, Co, the point E, and the line 32. The read-out conditions for the final readout are set on the basis of the image signal components of the preliminary read-out image signal SP corresponding to the thus found region 33 such that during the final readout the amount of light emitted by the region corresponding to the mamma pattern 9b and the retro-mamma space 9c may be detected accurately. In this embodiment, the points Bo and Co are connected with the line 32 by using lines, which are normal to the edge 11a of the stimulable phosphor sheet 11. Alternatively, the points Bo and Co may be connected with the line 32 by using lines, which are normal to the line 32. Also, in this embodiment, the region 33 is surrounded by straight lines (which constitute a zigzag line). Alternatively, the region 33 may be surrounded by any of other lines, such as a curve of secondary order, a curve of third order, or a spline-like curve.

An example of how the read-out conditions for the final readout are determined on the basis of the image signal components of the preliminary read-out image signal SP corresponding to the region 33 will be described hereinbelow.

Figure 18:
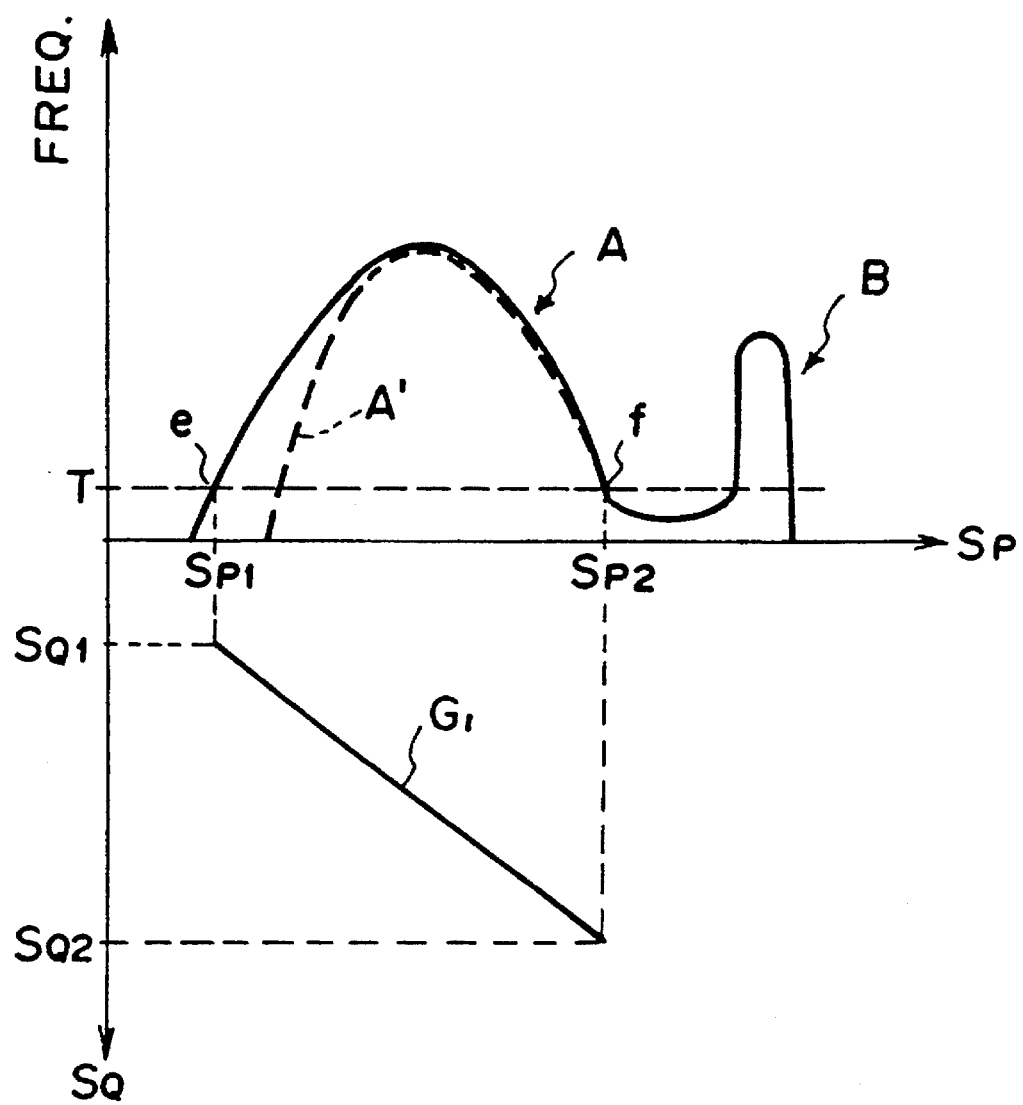
FIG. 18 is a graph showing the probability density function of a preliminary read-out image signal.

FIG. 18 is a graph showing an example of the probability density function of the image signal components of the preliminary read-out image signal SP corresponding to the region 33. The values of the image signal components of the preliminary read-out image signal SP are plotted on the horizontal axis. The relative frequency of occurrence of the values of the image signal components of the preliminary read-out image signal SP is plotted on the vertical axis at the upper part of the graph, and the values of the image signal SQ obtained during the final readout are plotted on the vertical axis at the lower part of the graph.

The probability density function of the image signal components of the preliminary read-out image signal SP corresponding to the region 33 is composed primarily of two projecting parts A and B. The projecting part A, which represents the frequency of occurrence of the image signal components of the preliminary read-out image signal SP having comparatively small values, corresponds to the mamma pattern 9b and the retro-mamma space 9c. The projecting part B, which represents the frequency of occurrence of the image signal components of the preliminary read-out image signal SP having comparatively large values, corresponds to part of the background region 8 included in the region 33. As described above, the projecting part A includes the image signal components corresponding to the retro-mamma space 9c. Therefore, the projecting part A extends to the smaller value side of the preliminary read-out image signal SP than a projecting part A', which corresponds to the mamma pattern 9b.

The values of the probability density function are compared to a predetermined threshold value T, starting with the value of the function at the minimum value of the preliminary read-out image signal SP and working along the direction of increase of the image signal values. In this manner, a point e, at which the probability density function first crosses the threshold value T, and a point f, at which the probability density function next crosses the threshold value T, are found. Values SP1 and SP2 are then found which correspond to the points e and f. The read-out conditions for the final readout are set such that the values SP1 and SP2 of the preliminary read-out image signal SP may be detected respectively as the minimum value SQ1 and the maximum value SQ2 of the image signal SQ during the final readout. Specifically, the read-out conditions for the final readout are set such that during the final readout the image information represented by values of the emitted light signal falling within the range of SP1 to SP2 may be detected as the image signal SQ with values lying on the straight line G1 shown in FIG. 18. By carrying out a final readout under the thus set read-out conditions, the image signal SQ is obtained which represents the mamma pattern 9b and the retro-mamma space 9c.

No limitation is imposed on how the boundary points A, B, and C between the mamma pattern 9b and the background region 8 are found, and how the boundary line between the retro-mamma space 9c and part of the chest wall pattern 9a other than the retro-mamma space 9c is found. For example, the technique described below may be employed.

Figure 19A:
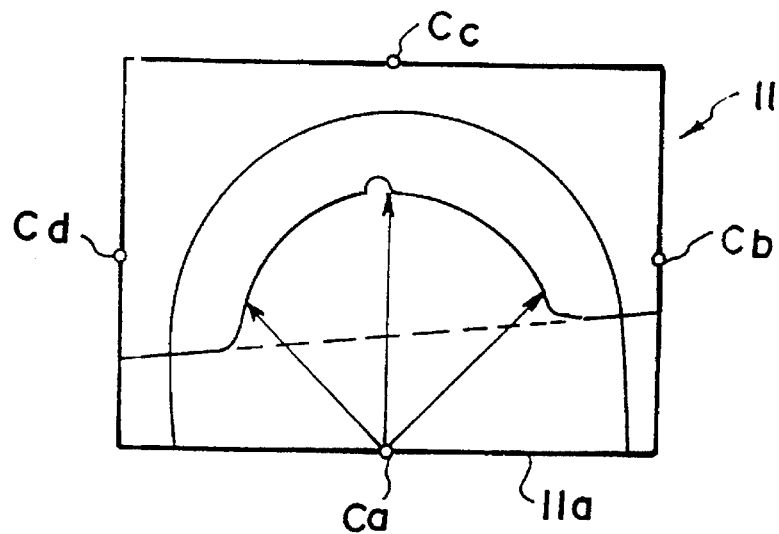
FIGS. 19A and 19B are explanatory views showing examples of X-ray images, which are the same as that shown in FIG. 17A, the views serving as an aid in explaining different examples of how a region, which approximately corresponds to an object image, is found.
Figure 19B:
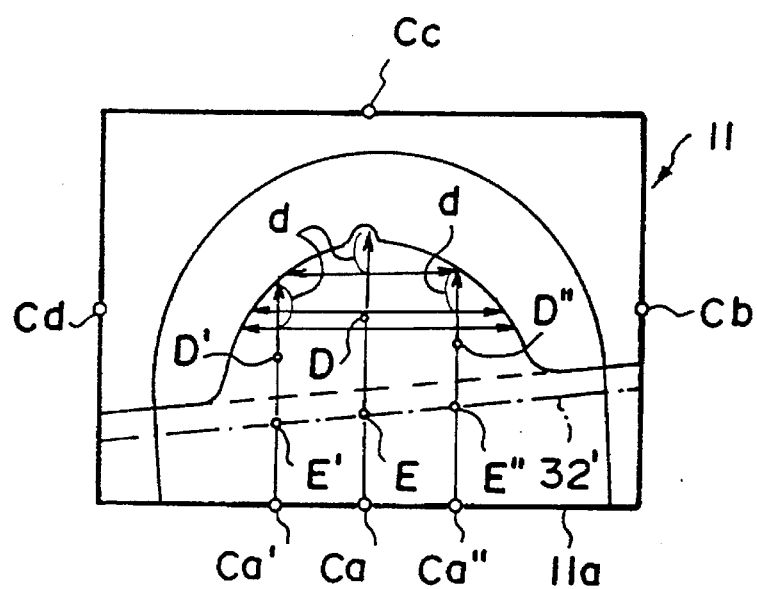

FIGS. 19A and 19B are explanatory views showing examples of X-ray images, which are the same as that shown in FIG. 17A, the views serving as an aid in explaining different examples of how a region, which approximately corresponds to an object image, is found.

In FIG. 19A, operations for finding a point lying on the edge of an object image are carried out on the signal components of the binary signal starting with the component corresponding to the center point Ca of the edge 11a of the stimulable phosphor sheet 11 and continuing with components corresponding to positions lying in each of the directions of 45°, 90°, and 135°. The boundary points between the mamma pattern 9b and the background region 8 may also be found by carrying such operations for each of the edges 11a, 11b, 11c, and 11d.

In FIG. 19B, in the same manner as that in the aforesaid embodiment, operations for finding the boundary points between the mamma pattern 9b and the background region 8 are carried out on the signal components of the binary signal starting with the component corresponding to the center point Ca of the edge 11a of the stimulable phosphor sheet 11. Also, in the same manner, operations for finding boundary points are carried out on the signal components of the binary signal starting with each of the components corresponding to the points Ca' and Ca", which are located on both sides of the center point Ca. In this case, at most nine boundary points are found. In cases where only eight points or fewer points can be found, the eight or fewer points are taken as the boundary points.

In such cases, three centers of gravity D, D', and D" are found in the same manner as that in the embodiment described above with reference to FIGS. 17A and 17B. Therefore, three picture elements E, E', and E" are found which lie at the boundary between the retro-mamma space 9c and part of the chest wall pattern 9a other than the retro-mamma space 9c. In such cases, two points F and G shown in FIG. 17A need not be found, but a line 32' connecting the three points E, E', and E" can be found.

Alternatively, any of operations other than those described above may be employed in order to find the boundary points. Also, more picture elements than those described above may be found. In the aforesaid embodiment of the method for adjusting read-out conditions and/or image processing conditions for a mamma radiation image including a chest wall pattern in accordance with the present invention, when the boundary points are to be found, the preliminary read-out image signal SP is converted into a binary signal. Alternatively, instead of the binary signal being generated, the boundary points may be found on the basis of the preliminary read-out image signal SP.

In the aforesaid embodiment of the method for adjusting read-out conditions and/or image processing conditions for a mamma radiation image including a chest wall pattern in accordance with the present invention, the read-out conditions for the final readout are adjusted by the operation means 29. Alternatively, predetermined read-out conditions may be used when the final readout is carried out regardless of the characteristics of the preliminary read-out image signal SP. On the basis of the preliminary read-out image signal SP, the operation means 29 may adjust image processing conditions G2 to be used in the image processing means 50 which carries out image processing of the image signal SQ. The information representing the image processing conditions G2 calculated by the operation means 29 may then be fed into the image processing means 50 as indicated by the broken line in FIG. 3. The operation means 29 may also adjust both the read-out conditions for the final readout and the image processing conditions.

As described above, one of various techniques may be employed. For example, the intensity of the laser beam produced by the laser beam source may be changed.

The aforesaid embodiment of the method for adjusting read-out conditions and/or image processing conditions for a mamma radiation image including a chest wall pattern in accordance with the present invention is applied to the X-ray image read-out apparatus wherein the preliminary readout is carried out. However, the method for adjusting read-out conditions and/or image processing conditions for a mamma radiation image including a chest wall pattern in accordance with the present invention is also applicable to X-ray image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by an operation means. The calculated image processing conditions are taken into consideration when the image signal is processed.

Also, in the aforesaid embodiment of the method for adjusting read-out conditions and/or image processing conditions for a mamma radiation image including a chest wall pattern in accordance with the present invention, an X-ray image of a mamma, which has been stored on a stimulable phosphor sheet, is processed. However, the method for adjusting read-out conditions and/or image processing conditions for a mamma radiation image including a chest wall pattern in accordance with the present invention is not limited to embodiments wherein a stimulable phosphor sheet is used. The method for adjusting read-out conditions and/or image processing conditions for a mamma radiation image including a chest wall pattern in accordance with the present invention is applicable widely when the read-out conditions for the final readout and/or the image processing conditions are adjusted on the basis of an image signal obtained by reading out an image from a recording medium, on which a mamma radiation image including a chest wall pattern has been recorded.

What is claimed is:

1. An apparatus for determining a mamma image position, comprising:

i) a prospective object image region finding means comprising:

means for obtaining an image signal made up of a series of image signal components representing a radiation image of an object, which radiation image has been recorded on a recording medium and is composed of:

a) a single object image region or a plurality of object image regions, in each of which a mamma pattern has been recorded such that it may project in an approximately semicircular shape from an edge of said recording medium toward the middle of said recording medium, said mamma pattern having been recorded by irradiating radiation, which has passed through a mamma, to said recording medium, b) a background region, which surrounds the approximately semicircular edge of each said object image region, and upon which the radiation impinged directly without passing through the object, and c) a scattered radiation image region, which is adjacent to said background region, and upon which scattered radiation impinged, ii) means for detecting a change in said image signal at the approximately semicircular edge of each said object image region on the basis of said image signal, and thereby finding a single prospective object image region or a plurality of prospective object image regions, and iii) a position determining means for judging the correctness or incorrectness of each said prospective object image region on the basis of a mean-level value of the values of the image signal components corresponding to each said prospective object image region, and thereby determining the position of each said object image region in said radiation image.

2. An apparatus for determining a mamma image position, comprising:

i) a prospective object image region finding means comprising:

means for obtaining an image signal made up of a series of image signal components representing a radiation image of an object, said radiation image being recorded on a recording medium and being composed of:

a) a single object image region or a plurality of object image regions, in each of which a mamma pattern has been recorded such that it may project in an approximately semicircular shape from an edge of said recording medium toward the middle of said recording medium, said mamma pattern having been recorded by irradiating radiation, which has passed through a mamma, to said recording medium, b) a background region, which surrounds the approximately semicircular edge of each said object image region, and upon which the radiation impinged directly without passing through the object, and c) a scattered radiation image region, which is adjacent to said background region, and upon which scattered radiation impinged, ii) means for detecting a change in said image signal at a plurality of points along the approximately semicircular edge of each said object image regions on the basis of said image signal, and thereby finding a single prospective object image region or a plurality of prospective object image regions, and iii) a position determining means for judging the correctness or incorrectness of each said prospective object image regions on the basis of a value of said image signal at a reference point which is located on a straight line extending between two of said points in each of said prospective object image regions, and thereby determining the position of each of said object image regions in said radiation image.

\* \* \* \* \*